(12) United States Patent
Turk et al.

(10) Patent No.: US 11,132,921 B2
(45) Date of Patent: Sep. 28, 2021

(54) HUMAN ANATOMIC MODELS FOR USE IN SURGICAL SIMULATION HAVING SYNTHETIC TISSUE PLANES

(71) Applicants: William Turk, Winnipeg (CA); Christian Petropolis, Winnipeg (CA)

(72) Inventors: William Turk, Winnipeg (CA); Christian Petropolis, Winnipeg (CA)

( * ) Notice: Subject to any disclaimer, the term of this patent is extended or adjusted under 35 U.S.C. 154(b) by 351 days.

(21) Appl. No.: 16/183,863

(22) Filed: Nov. 8, 2018

(65) Prior Publication Data

US 2019/0244543 A1    Aug. 8, 2019

Related U.S. Application Data

(60) Provisional application No. 62/627,853, filed on Feb. 8, 2018.

(51) Int. Cl.
*G09B 23/30* (2006.01)
*G09B 23/28* (2006.01)

(52) U.S. Cl.
CPC ............ *G09B 23/30* (2013.01); *G09B 23/28* (2013.01)

(58) Field of Classification Search
CPC ........ G09B 23/00; G09B 23/28; G09B 23/30; G09B 23/306
See application file for complete search history.

(56) References Cited

U.S. PATENT DOCUMENTS

| | | | | |
|---|---|---|---|---|
| 4,865,551 A * | 9/1989 | Maloney | ................ | G09B 23/30 434/271 |
| 5,893,719 A * | 4/1999 | Radow | ................... | G09B 23/28 434/271 |
| 7,896,653 B2 * | 3/2011 | Nylen | .................... | G09B 23/34 434/271 |
| 8,137,111 B2 * | 3/2012 | Carda | .................... | G09B 23/30 434/271 |
| 8,684,743 B2 * | 4/2014 | Van Dalen | ............. | G09B 23/30 434/267 |
| 9,336,692 B1 * | 5/2016 | Stoll | ....................... | G09B 23/28 |
| 9,384,681 B2 * | 7/2016 | Van Dalen | ........... | G09B 23/286 |
| 10,360,815 B2 * | 7/2019 | Bernal | ................... | G16H 40/40 |
| 10,360,819 B2 * | 7/2019 | Huh | ...................... | G09B 23/32 |
| 10,410,543 B2 * | 9/2019 | Gada | ..................... | G09B 23/34 |

(Continued)

*Primary Examiner* — Eugene L Kim
*Assistant Examiner* — Alyssa M Hylinski
(74) *Attorney, Agent, or Firm* — Ryan W. Dupuis; Kyle R. Satterthwaite; Ade & Company Inc.

(57) ABSTRACT

A surgical eye model assembly for simulating eye surgery using surgical tools includes a spherical surgical body formed of material which can be readily cut using the surgical tools so as to be representative of an ocular globe. A plurality of suspension arms extend radially outward from the surgical body in proximity to the rear side at circumferentially spaced apart locations about the central axis to suspend the surgical body relative to the a rigid base frame. Elongate strands of resilient material are tensioned about the surgical body to represent muscular strands. A sheet of resilient material surrounds the body and strands to be representative of a conjunctiva layer. Lubricant is provided as a layer about the strands and between the sheet and the body. Resilient material can also form in loosely bonded layers to define additional structures surrounding the body to represent a lens, vascular structures, eyelids, etc.

20 Claims, 18 Drawing Sheets

(56) References Cited

U.S. PATENT DOCUMENTS

| | | | |
|---|---|---|---|
| 10,665,135 B2* | 5/2020 | Segall | G09B 9/00 |
| 10,977,962 B2* | 4/2021 | Segall | G09B 23/34 |
| 2013/0090612 A1* | 4/2013 | de Juan, Jr. | A61F 9/0017 |
| | | | 604/300 |
| 2013/0288565 A1* | 10/2013 | McMullen | A63H 3/365 |
| | | | 446/321 |
| 2014/0170623 A1* | 6/2014 | Jarstad | G09B 23/30 |
| | | | 434/267 |
| 2014/0308644 A1* | 10/2014 | Wang | A61B 3/13 |
| | | | 434/271 |
| 2016/0063898 A1* | 3/2016 | Bernal | G09B 23/32 |
| | | | 434/271 |
| 2016/0098944 A1* | 4/2016 | Lin | G09B 23/32 |
| | | | 434/271 |
| 2016/0372011 A1* | 12/2016 | Bernal | G09B 23/34 |

* cited by examiner

HUMAN ANATOMIC MODELS FOR USE IN SURGICAL SIMULATION HAVING SYNTHETIC TISSUE PLANES

This application claims the benefit under 35 U.S.C. 119(e) of U.S. provisional application Ser. No. 62/627,853, filed Feb. 8, 2018.

FIELD OF THE INVENTION

The present invention relates to a human anatomic model for use in surgical simulation using conventional surgical tools to manipulate various simulated anatomical structures of the model, and more particularly the present invention relates to a method of manufacturing the human anatomic model in which the human anatomic model simulates tissue planes between the different anatomical structures being represented.

BACKGROUND

Creation of models of human anatomy has garnered increasing interest. This is particularly true in medicine where traditionally cadaveric specimens have been used during surgical training. There has been increased demand for surgical simulation using models due to the benefits of patient safety, lower cost, greater availability, and long shelf life.

One of the most challenging aspects of developing surgical models is creating realistic, life like tissue planes. This is critical to creating synthetic tissues that act in a manner similar to live human or animal tissue when practicing surgery. This has been a major deficiency of currently available commercial models.

The process of creating tissue planes has applicability for varied human tissue. Instances described here in the human eye (including such structures vitreous, sclera, Tenon's capsule, conjunctiva, extraocular muscle, crystalline lens, capsular complex), skin (including epidermis, dermis, and subcutaneous fat), muscle, vascular structures (arteries and veins including intima, media and adventitia), nerves, fat (including orbital and subcutaneous), bone and peri-osteum.

SUMMARY OF THE INVENTION

According to one aspect of the present invention there is provided a surgical eye model assembly for simulating eye surgery using surgical tools, the assembly comprising:

a surgical body formed of material which can be readily cut using the surgical tools, the surgical body defining a central axis extending from a rear mounting side to a front side which is generally semicircular about the central axis so as to be representative of an ocular globe;

a plurality of suspension arms extending radially outward from the surgical body in proximity to the rear side at circumferentially spaced apart locations about the central axis;

a rigid base frame comprising a central recess and a plurality of mounting locations at circumferentially spaced apart locations about the central recess;

the suspensions arms being coupled under tension to respective ones of the mounting locations on the rigid base frame such that the surgical body is resiliently suspended within the central recess so as to allow for translating movement of the surgical body along the central axis relative to the base frame and so as to allow for angular deflection of the central axis relative to the base frame.

In one embodiment, the surgical body may be formed of a cadaveric eye supported on a mounting ring, in which the plurality of suspension arms extend radially outwardly from the mounting ring. More preferably however, the surgical body is formed of a synthetic resilient material.

The assembly may further include a face plate adapted to be mounted on the base frame and defining an eye opening therein for alignment with the surgical body, in which the face plate further comprises two diametrically opposed eyelid portions for overlapping respective portions of the front side of the surgical body which frictionally engage the surgical body and which pre-tension the suspension arms. More particularly, the face plate may have an outer surface which is shaped to represent at least a cheekbone area, a nose, and a brow portion of a human face surrounding an eye opening in the face plate. When the face plate is coupled to the base frame, the face plate preferably frictionally engages the surgical body so as to pretension the suspension arms by deflecting the surgical body downwardly into the respective cavity in the base frame.

The assembly may further include a rigid base element fixed to the surgical body at a rear of the surgical body in which the suspension arms protrude radially from the surgical body at a location below the rigid base element.

The surgical body described above may further comprise:
a core member representative of a sclera; and
a plurality of muscular strands formed of resilient material which are elongate between opposing first and second ends which are mounted in fixed relation to the core member such that an intermediate portion of each muscular strand is uncoupled relative to the core member and extends under tension partway about a circumference of the core member.

In one instance, the first and second ends of the muscular strands comprise front and rear ends in which the front ends of the muscular strands are joined to the core member at the front side of the body at circumferentially spaced positions about the central axis, and the rear ends of the muscular strands are coupled in fixed relation to the core member at the rear mounting side of the body so as to be under tension about the core member between the front and rear ends whereby the muscular strands simulate rectus muscles. When a rigid base element fixed to the surgical body at a rear of the surgical body, the muscular strands may be fixed at the second ends thereof on the rigid base element at the rear of surgical body.

Alternatively, (i) the first ends of the muscular strands may be fixed onto a common first side of core member, (ii) the intermediate portions may extend circumferentially about diametrically opposing portions of the core member, and (iii) the second ends may be mounted on rigid support elements protruding from a second side of the core member opposite the first side of the core member whereby the muscular strands simulate superior and inferior oblique muscles.

In either instance of the configuration of the muscular strands, preferably a lubricant layer is provided between the muscular strands and the core member.

A conjunctiva sheet may also be joined between the front and rear sides of the core member described above with a lubricant layer received between the conjunctiva sheet and the core member.

The surgical body described above may further comprise: (i) a core member representative of a sclera; (ii) a plurality of muscular strands supported on the core member to extend partway about a circumference thereof; and (iii) a conjunctiva sheet spanning over the core member and the muscular strands between the front and rear sides of the body; in which the conjunctiva sheet is fixedly coupled at a central location on the sheet to the core member at the front side of the body and being fixedly coupled in relation to the core member at the rear side of the body; and in which the conjunctiva sheet includes an intermediate portion between the front and rear sides which spans over the muscular strands which is supported in floating relationship relative to the core member and the muscular strands.

Preferably a lubricant layer is also received between the conjunctiva sheet and the core member.

The surgical body described above may further comprise: (i) a spherical outer shell representative of a sclera formed of a first resilient material having a wall thickness which is less than 10% of an outer diameter of the outer shell; and (ii) a core material filling the spherical outer shell, the core material comprising a second resilient material which is softer than the first resilient material forming the outer shell.

The surgical body may yet further comprise an iris member representative of an iris and a cornea member representative of a cornea which are supported at the front side of the body by a conjunctiva sheet forming an envelope surrounding the surgical body.

The surgical body may also further comprise: (a) a core member representative of a sclera; and (b) a lens member representative of an ocular lens which is supported on the core member at the front side of the body, in which the lens member comprises: (i) a nucleus formed of silicone; and (ii) a plurality of cortex layers in sequential layers of silicone surrounding the nucleus, each cortex layer being applied when the previously applied layer has only partially cured such that the cortex layers are partially adhered to one another while remaining separable from one another using the surgical tools.

The surgical body may yet further comprise: (i) a core member representative of a sclera; (ii) a lens member representative an ocular lens; and (iii) a capsular envelope representative of a capsule receiving the lens member therein and supporting the lens member on the core member at the front side of the body; in which the lens member comprises a plurality of layers of silicone material and the capsular envelope comprises a layer of silicone material which is thinner than the layers of silicone material forming the lens member and which is loosely bonded to the lens member such that the capsular envelope is less resistant to shearing from the lens member than the layers of the lens member are from one another.

According to another aspect of the invention there is provided a method of constructing an anatomical model assembly representative of a human anatomical structure having a plurality of different tissue planes, the method comprising:

forming a first layer of silicone in a shape representative of a first anatomical tissue plane and allowing the silicone of the first layer to at least partially cure;

applying a second layer of silicone to the first layer in a shape representative of a second anatomical tissue plane and allowing the silicone of the second layer to at least partially cure such that the second layer is bonded to the first layer by a prescribed bonding force which less than a shear force required to tear the second layer.

The method may further include: (i) applying the second layer in an uncured state onto the first layer when the first layer has not yet fully cured. (ii) applying a lubricant between the first and second layers, (iii) diluting the silicone of the second layer relative to the first layer, (iv) diluting the silicone with silicone oil or with a silicone solvent, (v) applying adhesive to first layer before applying of the second layer, and/or (vi) adding an additive such as microfibres to one of the layers to increase density thereof relative to the other layer.

In one example, the first layer may be an elongate core member representative of an intima of a vascular structure, the second layer may be applied about a full circumference and along a full length of the elongate core member so as to be representative of tunica media, and a third layer may be applied about a full circumference of the second layer along a full length of the elongate core member so as to be representative of a tunica external.

According to another important independent aspect of the present invention there is provided a surgical eye model assembly for simulating eye surgery using surgical tools, the assembly comprising:

a surgical body formed of material which can be readily cut using the surgical tools, the surgical body defining a central axis extending from a rear mounting side to a front side which is generally semicircular about the central axis so as to be representative of an ocular globe;

a base frame defining a ocular cavity receiving the surgical body therein such that the surgical body is readily releasable from the base frame;

a face plate formed of resilient material releasably mounted onto the base frame, the face plate having an outer surface which is shaped to represent at least a cheekbone area, a nose, and a brow portion of a human face surrounding an eye opening in the face plate;

the eye opening of the faceplate being reduced in size relative to a circumference of the surgical body so as to define a lower eyelid portion and an upper eyelid portion which partially overall diametrically opposing portions of the semicircular front side of the surgical body respectively.

According to another important independent aspect of the present invention there is provided a surgical eye model assembly for use with a base frame in a surgical eye model for simulating eye surgery using surgical tools, the base frame defining an ocular cavity receiving the surgical model therein such that the surgical model is readily releasable from the base frame, the model comprising:

a surgical body formed of material which can be readily cut using the surgical tools, the surgical body defining a central axis extending from a rear mounting side to a front side which is generally semicircular about the central axis so as to be representative of an ocular globe;

the surgical body comprising:

a core member representative of a sclera; and a plurality of muscular strands formed of resilient material which are elongate between opposing first and second ends which are mounted in fixed relation to the core member such that an intermediate portion of each muscular strand is uncoupled relative to the core member and extends under tension partway about a circumference of the core member.

According to another important independent aspect of the present invention there is provided a surgical eye model assembly for use with a base frame in a surgical eye model for simulating eye surgery using surgical tools, the base frame defining an ocular cavity receiving the surgical model therein such that the surgical model is readily releasable from the base frame, the model comprising:

a surgical body formed of material which can be readily cut using the surgical tools, the surgical body defining a central axis extending from a rear mounting side to a front side which is generally semicircular about the central axis so as to be representative of an ocular globe;

the surgical body comprising:
a core member representative of a sclera; and
a plurality of muscular strands formed of resilient material which are elongate between opposing front and rear ends, in which the front ends of the muscular strands being joined to the core member at the front side of the body at circumferentially spaced positions about the central axis, and the rear ends of the muscular strands being coupled in fixed relation to the core member at the rear mounting side of the body so as to be under tension about the core member between the front and rear ends.

In this instance, the assembly may further include a lubricant between the muscular strands and the core member. The assembly may yet further include a conjunctiva sheet joined between the front and rear sides of the core member and a lubricant received between the conjunctiva sheet and the core member.

According to another important independent aspect of the present invention there is provided a surgical eye model assembly for use with a base frame in a surgical eye model for simulating eye surgery using surgical tools, the base frame defining an ocular cavity receiving the surgical model therein such that the surgical model is readily releasable from the base frame, the model comprising:
a surgical body formed of material which can be readily cut using the surgical tools, the surgical body defining a central axis extending from a rear mounting side to a front side which is generally semicircular about the central axis so as to be representative of an ocular globe;
the surgical body comprising:
a core member representative of a sclera;
a plurality of muscular strands supported on the core member at circumferentially spaced apart positions about the central axis of the body; and
a conjunctiva sheet spanning over the core member and the muscular strands between the front and rear sides of the body;
the conjunctiva sheet being fixedly coupled at a central location on the sheet to the core member at the front side of the body and being fixedly coupled in relation to the core member at the rear side of the body;
the conjunctiva sheet including an intermediate portion between the front and rear sides which spans over the muscular strands and which is supported in an uncoupled and floating relationship relative to the core member and the muscular strands.

The assembly in this instance may further include a lubricant received between the conjunctiva sheet and the core member.

According to another important independent aspect of the present invention there is provided a surgical eye model assembly for use with a base frame in a surgical eye model for simulating eye surgery using surgical tools, the base frame defining an ocular cavity receiving the surgical model therein such that the surgical model is readily releasable from the base frame, the model comprising:
a surgical body formed of material which can be readily cut using the surgical tools, the surgical body defining a central axis extending from a rear mounting side to a front side which is generally semicircular about the central axis so as to be representative of an ocular globe;
the surgical body comprising:
a spherical outer shell representative of a sclera formed of a first resilient material having a wall thickness which is less than 10% of an outer diameter of the outer shell; and
a core material filling the spherical outer shell, the core material comprising a second resilient material which is softer than the first resilient material forming the outer shell.

According to another important independent aspect of the present invention there is provided a surgical eye model assembly for use with a base frame in a surgical eye model for simulating eye surgery using surgical tools, the base frame defining an ocular cavity receiving the surgical model therein such that the surgical model is readily releasable from the base frame, the model comprising:
a surgical body formed of material which can be readily cut using the surgical tools, the surgical body defining a central axis extending from a rear mounting side to a front side which is generally semicircular about the central axis so as to be representative of an ocular globe;
the surgical body comprising a core member representative of a sclera and a lens member representative of an ocular lens which is supported on the core member at the front side of the body;
the lens member comprising:
a nucleus formed of silicone; and
a plurality of cortex layers in sequential layers of silicone surrounding the nucleus, each cortex layer being applied when the previously applied layer has only partially cured such that the cortex layers are partially adhered to one another while remaining separable from one another using the surgical tools.

According to another important independent aspect of the present invention there is provided a surgical eye model assembly for use with a base frame in a surgical eye model for simulating eye surgery using surgical tools, the base frame defining an ocular cavity receiving the surgical model therein such that the surgical model is readily releasable from the base frame, the model comprising:
a surgical body formed of material which can be readily cut using the surgical tools, the surgical body defining a central axis extending from a rear mounting side to a front side which is generally semicircular about the central axis so as to be representative of an ocular globe;
the surgical body comprising a core member representative of a sclera, a lens member representative an ocular lens, and a capsular envelope representative of a capsule receiving the lens member therein and supporting the lens member on the core member at the front side of the body;
the lens member comprising a plurality of layers of silicone material; and
the capsular envelope comprising a layer of silicone material which is thinner than the layers of silicone material forming the lens member and which is loosely bonded to the lens member such that the capsular envelope is less resistant to shearing from the lens member than the layers of the lens member are from one another.

The assembly in this instance may further include an iris member representative of an iris and a cornea member representative of a cornea which are moulded separately from the lens member and which are supported at the front side of the body by a conjunctiva sheet forming an envelope surrounding the surgical body.

According to another important independent aspect of the present invention there is provided a surgical eye model assembly for simulating eye surgery using surgical tools, the assembly comprising:
a central body which is generally spherical in shape about a central axis spanning between a rear side and a front side of the central body so as to be representative of an ocular globe;

a conjunctiva sheet comprising two opposing side portions spanning over diametrically opposing sides of the central body from the rear side to the front side of the central body so as to define an eyelid opening at the front side of the central body between front edges of the opposing side portions of the conjunctiva sheet respectively;

a tarsal plate member including two opposing side portions spaced apart at diametrically opposing locations relative to the eyelid opening therebetween, each of the side portions of the tarsal plate member overlaying a forward portion of a respective one of the side portions of the conjunctiva sheet respectively;

a muscle member including two opposing side portions spaced apart at diametrically opposing locations relative to the eyelid opening therebetween, each of the side portions of the muscle member overlaying a forward portion of a respective one of the side portions of the tarsal plate member respectively;

the tarsal plate member being adhesively bonded to the conjunctiva sheet; and the muscle member being loosely bonded to underlying members including the tarsal plate member such that the muscle member is less resistant to shearing from the underlying members than the tarsal plate member is resistant to shearing from the conjunctiva sheet.

In this instance, the assembly may further include an orbital septum membrane received between the muscle member and the conjunctiva sheet.

According to another important independent aspect of the present invention there is provided a surgical eye model assembly for simulating eye surgery using surgical tools, the assembly comprising:

a base frame formed of rigid material and defining a central socket including perimeter walls surrounding a central recess and an annular rim portion extending about an exterior opening through which the central recess is accessible such that the central socket is representative of an ocular socket;

a central body received within the central socket, the central body being generally spherical in shape about a central axis spanning between a rear side and a front side of the central body so as to be representative of an ocular globe;

an elongate multilayer strand of material representative of a neurovascular structure received within the central socket of the base frame; and a plurality of resilient strands of material representative of orbital fat received between the rear side of the central body and perimeter walls of the central socket in the base frame.

In this instance, the assembly may further include an outer frame representative of a human skull and locating a frame socket therein within which the base frame is received in mating connection.

The assembly can also include an elongate nerve strand of material representative of an optical nerve received within the central socket of the base frame, and/or an elongate vascular strand of material representative of a vascular structure received within the central socket of the base frame.

BRIEF DESCRIPTION OF THE DRAWINGS

Various embodiments of the invention will now be described in conjunction with the accompanying drawings in which.

In the drawings like characters of reference indicate corresponding parts in the different figures.

DETAILED DESCRIPTION

Referring to the accompanying figures there is illustrated a method of manufacturing an anatomic model assembly for use in simulating surgery using conventional surgical tools such as scalpels, etc. The model assembly is primarily formed of a resilient material, for example silicone, which can be readily cut and manipulated for placement of stitches therein and the like using the conventional surgical tools during a simulated surgery.

Although various examples of surgical anatomic model assemblies are described herein and illustrated in the accompany figures, in each instance a human anatomic model is provided primarily formed of silicone material to represent tissues intended to be cut and/or manipulated by conventional surgical tools during a simulated surgical procedure. The silicone material can be used in different densities to simulate different tissue types. For more rigid anatomical structures being represented, other materials such as more rigid plastic material may be used for simulating bone and the like for example.

Typically, the silicone material is moulded in one or more layers to represent each tissue type of a simulated anatomical structure, either by moulding the layers separately for subsequent joining, or by moulding a core or first layer initially followed by application of additional layers to the core or first layer. Additional layers may be applied over a first layer when the first layer is fully or partially cured by either directly applying the second layer in and uncured state to the first layer, or by applying an additional coating layer therebetween, or by modifying the composition of the silicone material of the second layer relative to the first layer. Examples include use of a lubricant material applied between two separately cured layers, use of a silicone oil layer between silicone layers, use of an adhesive material between silicone layers, or use of the various additives including silicone oil, or a silicone solvent/thinner, or fibers which can decrease or increase the density or thickness of one silicone layer relative to a previous layer. In the resulting anatomic model assembly, the first layer defines a first tissue plane and the second layer applied subsequently thereto defines a second tissue plane which is partially bonded or adhered to the first layer. Typically, the prescribed bonding force which defines the bonding between the layers is less than the shear force required to tear either one of the layers so that the layers can be readily separated from one another with surgical tools during a simulated surgical procedure while individual layers remain substantially intact. When multiple layers are provided representing a variety of different structures, different techniques can be applied between different ones of the layers to provide varying degrees of adhesion between multiple different layers of silicone representative of different tissue planes within the anatomic model.

Figure 33:
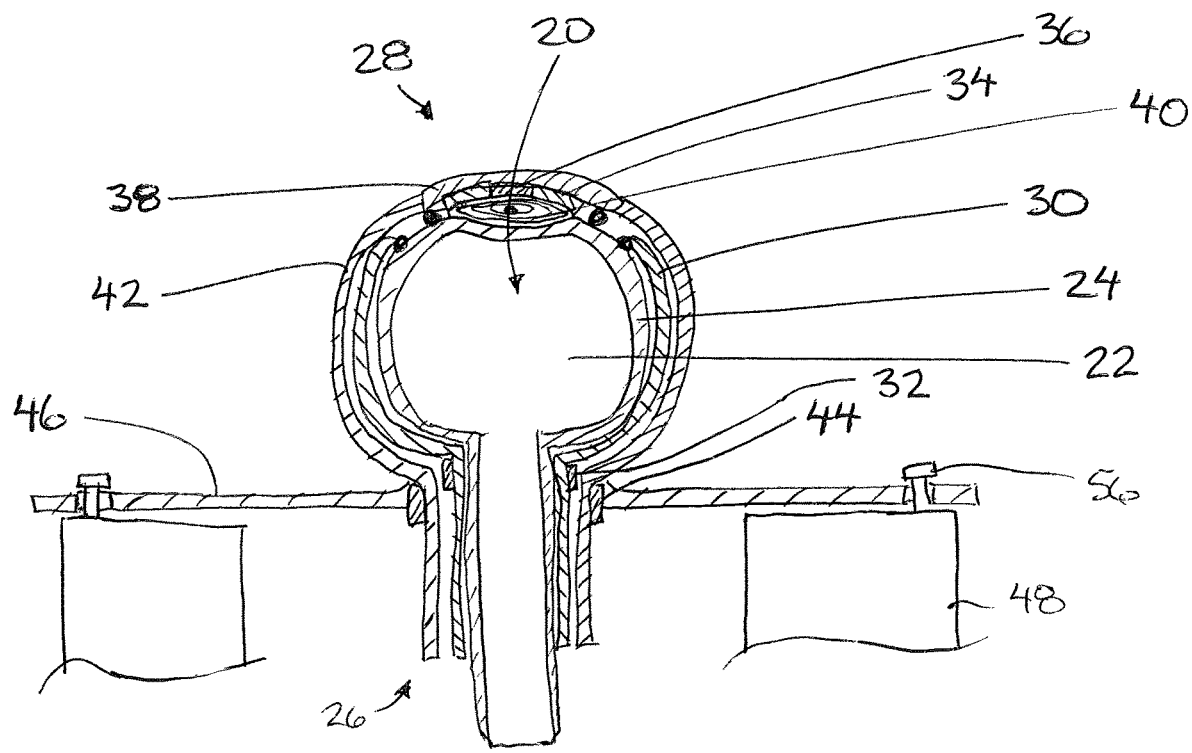
FIG. 33 illustrate an eye model assembly which is formed according to the steps of FIGS. 1 to 11 for simulating a strabismus surgery according to the present invention.
Figure 34:
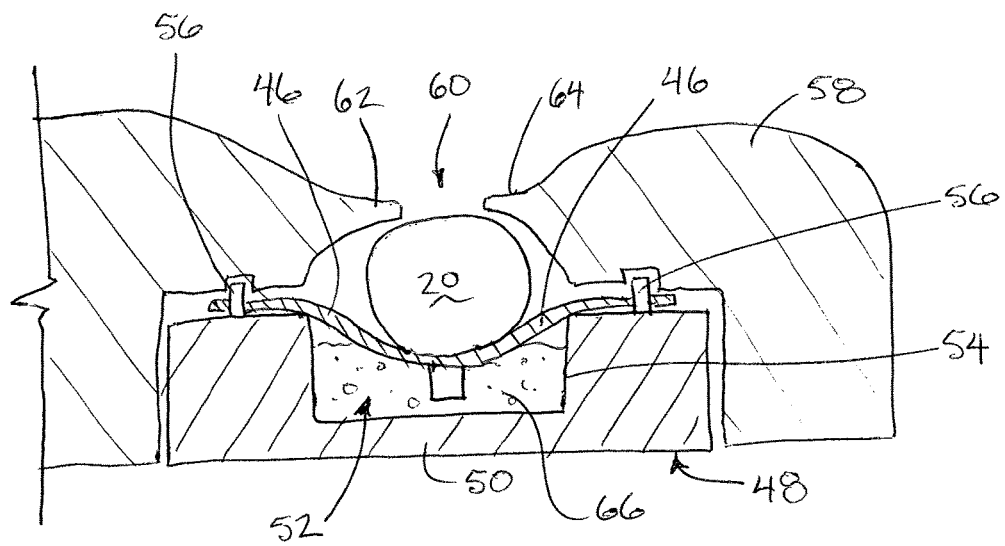
FIG. 34 illustrates a base frame and corresponding face plate for receiving the eye model assembly of FIG. 33 therein.

Turning initially to FIGS. 33 and 34, the model assembly of a human eye is illustrated which is consistent with the manufacturing steps of FIGS. 1 through 11. The model assembly in this instance includes a surgical body 20 formed of a spherical core material 22 and a spherical shell 24 substantially fully surrounding the core material. The surgical body is spherical about a central axis spanning from a rear mounting side 26 to a front side 28 which is generally semi-spherical in shape about the central axis. The core material 22 comprises a gel material which is softer than the material forming the outer shell and includes an integral stem attached thereto which protrudes from the rear mounting side 26. The outer shell 24 fully surrounds the core material 22 as well as the protruding stem at the rear side. The core material represents the vitreous of the eye with the outer shell 24 representing the sclera. The outer shell is fully bonded to the core material across the full interface therebetween.

A plurality of elongate muscle strands 30 are moulded of resilient silicone material and are attached to the surgical body 22 to represent the muscles attached to the ocular globe of a human eye. In the illustrated embodiment, four elongate muscle strands are provided on the model assembly at evenly spaced apart positions about the circumference of the central axis such that each muscle strand includes a forward end bonded by integral moulding to the outer shell 24 at the front side 28 so as to be spaced radially outward from the central axis. Each muscle strand 30 extends rearwardly about the outer shell for subsequent joining to the mounting stem at the rear mounting side 26 of the surgical body by a suitable mounting band 32 clamped about the mounting stem. The muscle strands are pulled under tension about the surgical body between the front end bonded at the front side of the body to the rear end clamped by the band 32 at the rear side of the body. In this manner, each strand includes an intermediate portion between the front and rear ends that are fixed relative to the core member, in which the intermediate portion extends partway about a circumference of the core member while remaining uncoupled and floating relative to the core member.

Figure 5:
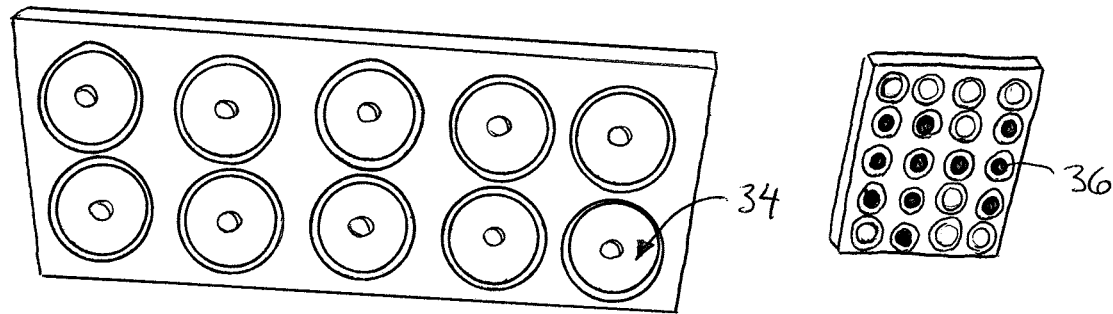
FIG. 5 illustrates the molding of an iris member, a pupil member and a cornea member to represent corresponding structures of a human eye.

Using the moulds illustrated in FIG. 5, an iris member 34, a pupil member 36 and a cornea member 38 are separately moulded and then joined together at the front side of the surgical body 20 so as to be concentric with the central axis thereof.

Optionally, a lens member 40 according to FIG. 11, which is described in further detail below, may be also moulded of silicone material and supported concentrically at the front side of the surgical body prior to application of the iris member 34, pupil member 36 and cornea member 38.

Figure 6:
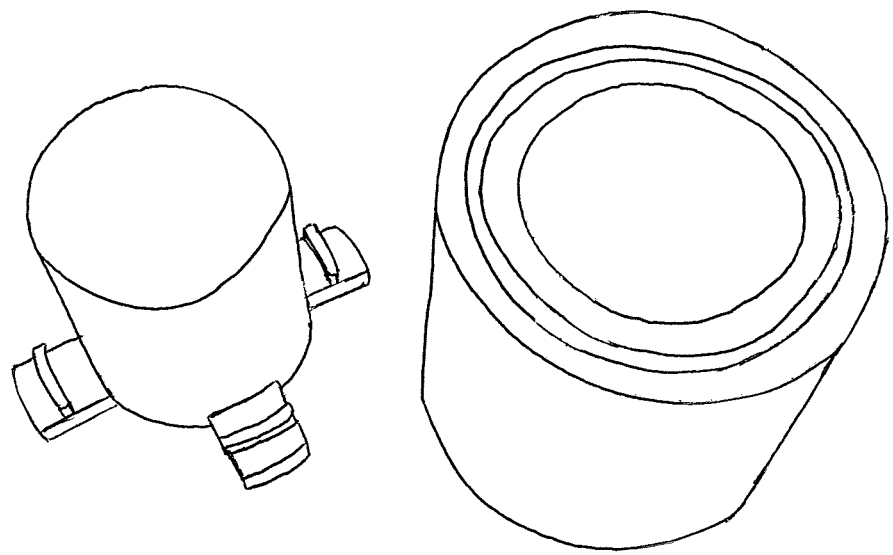
FIG. 6 illustrates a mold for molding a conjunctiva sheet to be applied to the surgical body of FIG. 1.
Figure 7:
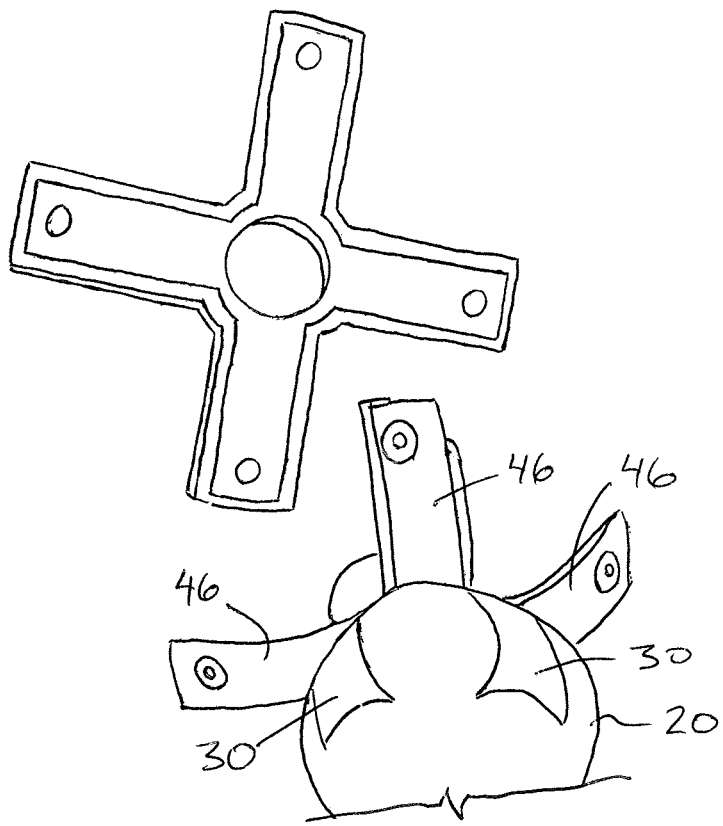
FIG. 7 illustrates a mold for molding suspension arms integrally onto the surgical body of FIG. 1.

Using the mould according to FIG. 6, a conjunctiva sheet 42 can be separately moulded and then joined to the surgical body 20 after moulding. The conjunctiva sheet 42 is an elongate tubular shape with an end wall enclosing one end of the tubular structure which locates the cornea 38, the pupil member 36 and the iris member 34 therein. The tubular member is mounted concentrically about the central axis of the surgical body and is wrapped tightly about the circumference of the surgical body so as to be substantially devoid of any air gaps therebetween from the front side to the rear side of the surgical body 20. An additional clamping band 44 can be used at the rear side for securing the rear portion of the moulded conjunctiva sheet 42 at the rear side of the surgical body 20. A lubricant material can be used to fill the gaps between the conjunctiva sheet 42 and the outer shell 24 of the surgical body, as well as surrounding the muscle strands 30 also received therebetween. In this manner, the conjunctiva sheet includes an intermediate portion defined between the opposing front and rear ends of the sheet that are fixed relative to the core member, in which the intermediate portion remains uncoupled and floating relative to the core member.

The model assembly of FIG. 33 further includes a plurality of suspension arms 46 extending radially outward from the central axis of the surgical body at four evenly spaced apart positions in a circumferential direction. Each suspension arm is an elongate strip of resilient silicone material which is integrally moulded at the inner end thereof to the exterior of the conjunctiva sheet 42 at the mounting location of the clamping band 44 at the rear side 26 of the surgical body. The suspension arms lie in a common plane which is perpendicular to the central axis of the surgical body 20. Each support arm extends radially outward from the inner end thereof which is bonded by integral moulding to the rear side of the surgical body to a respective outer end having a mounting aperture therein for mounting on to a suitable base frame 48.

As shown in FIG. 34, the base frame 48 includes a bottom plate 50 defining the bottom side of the frame. A central recess 52 is defined by a plurality of perimeter walls 54 extending upwardly from the bottom plate 50 about the perimeter of the central recess 52. A set of four mounting posts 56 are mounted at evenly spaced apart positions about the circumference of a central axis of the central recess, generally within a common plane spaced above the flat bottom of the bottom plate 50. The location of the mounting posts 56 corresponds approximately to the location of the mounting apertures in the four support arms 46 of the model assembly according to FIG. 33 when the support arms are slightly resiliently stretched in length and mounted under tension.

Figure 9:
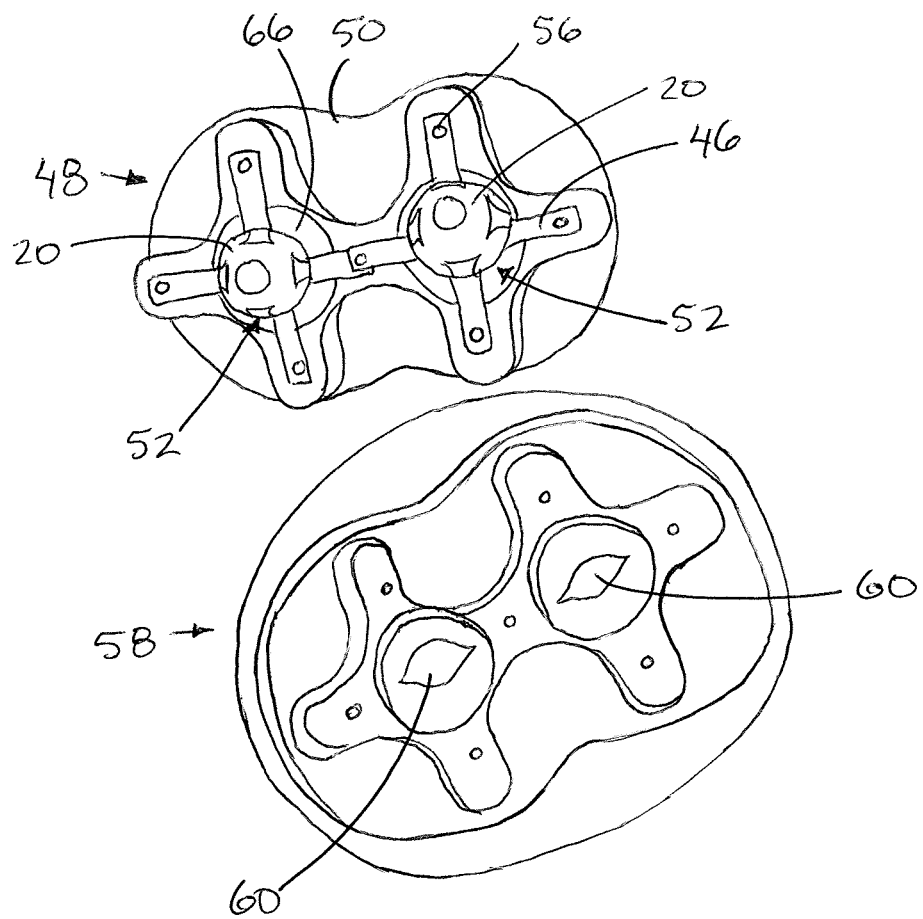
FIG. 9 and FIG. 10 illustrate an underside of a face plate of the model assembly and a top side of the face plate after mounting onto the base frame of FIG. 8 respectively.
Figure 10:
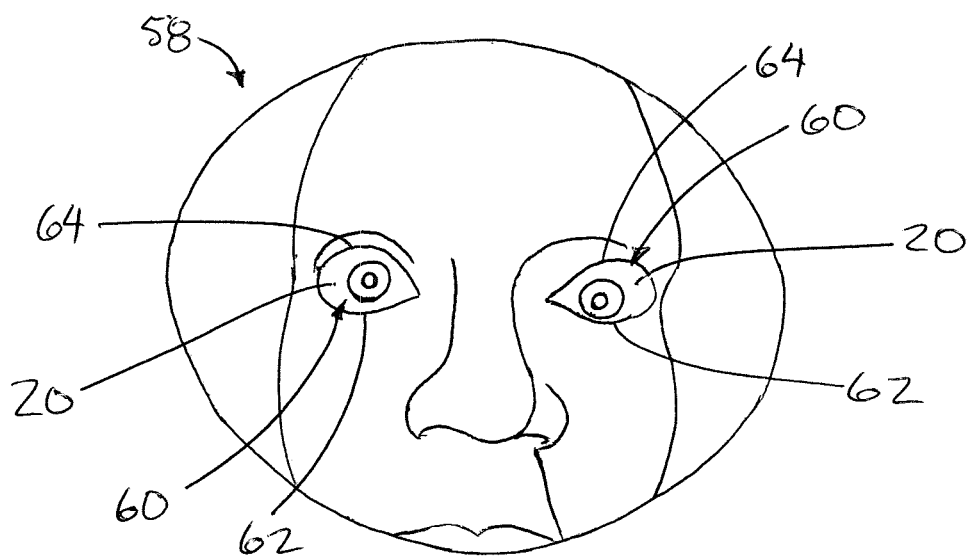

An outer face plate 58 according to FIGS. 9 and 10 can be mounted over top of the base frame 48 after suspension of the surgical body 20 on the base frame. The faceplate is formed of resilient material which is releasably mounted onto the base frame, for example by including a set of sockets for alignment with the mounting posts 56 respectively. The faceplate has an outer surface which is shaped to represent, for example, a cheekbone area, part of a nose, and a brow portion of a human face surrounding an eye opening 60 of the faceplate which aligns with the surgical body 20 representing a human eye.

As illustrated in FIG. 9, the base frame may be shaped to define two spaced apart central recesses which are identical to one another and each receive a respective one of two surgical bodies 20 therein. In this instance the faceplate may represent a full face of a person with a pair of eye openings therein for alignment with the two surgical bodies 20 respectively.

In each instance, the eye openings 60 in the faceplate are reduced in area relative to the circumference of the surgical body 20 about the central axis thereof. In this manner, when the eye opening is bounded by diametrically opposing ones of a lower eyelid portion 62 and an upper eyelid portion 64, the eyelid portions partially overlap diametrically opposing portions of the semicircular front side of the surgical body respectively. In addition to the overlap, the eyelid portions of the faceplate frictionally engage the front side of the surgical body 20 and act to tension the support arms by pushing the surgical body 20 further down into the corresponding central recess 52 in the base frame. When the surgical bodies 20 are suspended in the manner described above, each surgical body is resiliently suspended within the respective central recess so as to allow for some translating movement of the body along the central axis relative the base frame and so as to allow for angular deflection of the central axis of the surgical body away from the central axis of the base frame and away from a normal vertical orientation perpendicular to the bottom plate 50 of the base frame. The resilient support arms act to bias the surgical body back to the normal position in which the central axis is perpendicular to the bottom plate. The frictional engagement of the eyelid portions provides a dampening effect which resists displacement of the surgical body away from the normal orientation. Optionally, a suitable gel material 66 may be placed within the bottom of the central recess 52 between the surgical body 20 and the bottom of the base frame to provide some additional dampening to resist movement of the surgical body away from the normal position.

Figure 11:
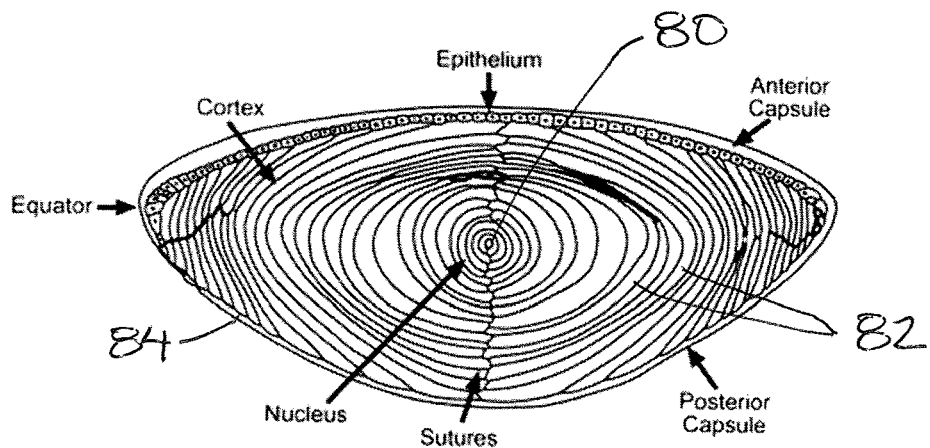
FIG. 11 illustrates a molded multi-layer lens member for optional use on the surgical body of FIG. 1.

When optionally using a lens member according to FIG. 11, initially a central nucleus member 80 is formed of silicone and allowed to partially set before repeated dipping to form subsequent layers 82 with each subsequent layer being only partially cured before application of the next layer. A capsular member 84 is then formed about the multiple layers 82 of the lens member by creating a much thinner layer of silicone. The capsular member 84 that forms an envelope about the cortex layers 82 is thinner than the cortex layers and is loosely bonded to the outermost cortex layer such that the capsular envelope is less resistant to shearing from the lens member than the layers of the lens member are from one another.

Figure 35:
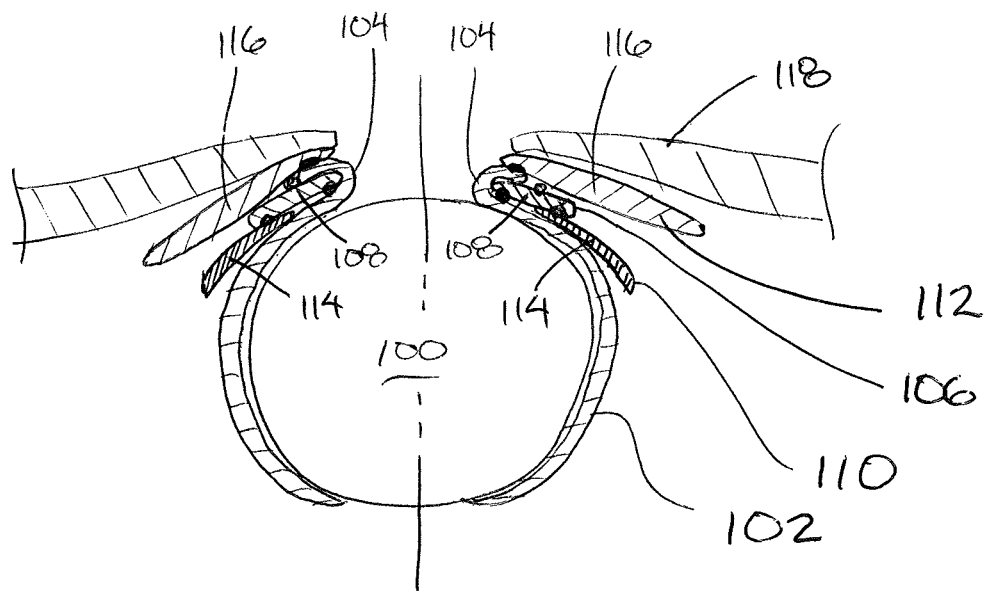
FIG. 35 illustrates an eyelid structure model assembly which can optionally co-operate with the eye model assembly according to FIG. 33.

Turning now to FIG. 35, there is illustrated a model assembly representative of a human eyelid structure according to the manufacturing steps of FIGS. 12 through 24. The model assembly of FIG. 35 may use a basic spherical central body 100 in the centre thereof, or alternatively the surgical body 20 including the core material 22 and the outer shell 24 according to FIG. 33 with a lens member 40 thereon may be used as the central body 100.

Figure 14:
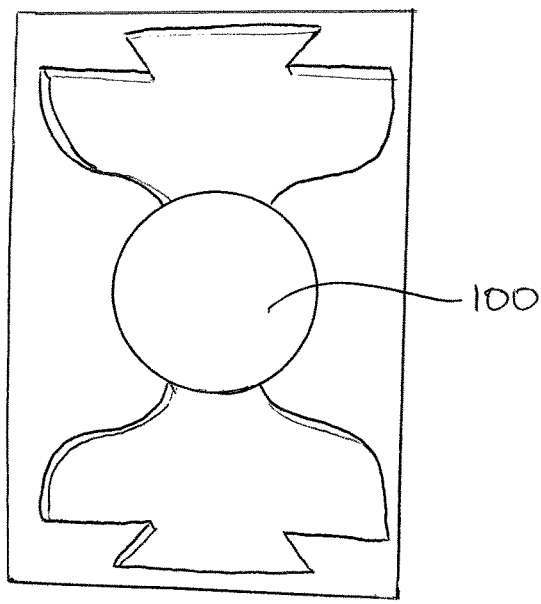
FIG. 14 illustrates a mould for forming a conjunctiva sheet about the central body of FIG. 13.

The central body 100 in this instance is initially positioned within the mould of FIG. 14 to mould a conjunctiva sheet 102 having two opposing side portions 104 spanning over diametrically opposing sides of the central body from the rear side to the front side thereof so as to define an eyelid opening at the front side of the central body between the front edges of the opposing side portions of the conjunctiva sheet 102 respectively.

Figure 18:
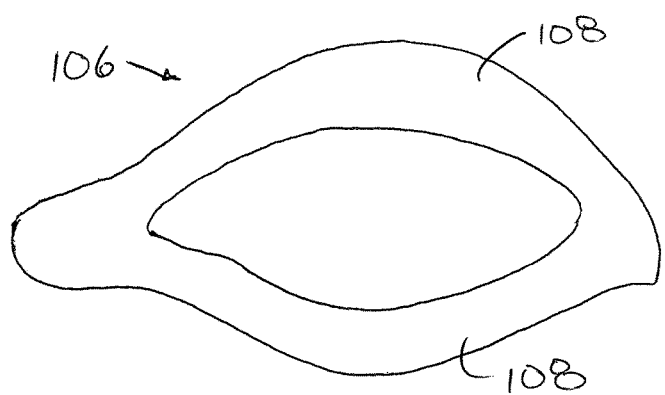
FIG. 18 illustrates a separately moulded tarsal plate member having two opposing side portions for incorporation into the mould assembly of FIG. 35.

A tarsal plate member 106 according to FIG. 18 is shaped to be generally annular about a central opening to define two opposing side portions 108 which are spaced apart at diametrically opposing locations relative to the eyelid opening therebetween. Each of the side portions of the tarsal plate member overlays a forward portion of a respective one of the side portions of the conjunctiva sheet respectively. The forwardmost edges of the two opposing side portions 104 of the conjunctiva sheet are folded back over the inner edge of the tarsal plate member that defines the central opening therein.

Figure 21:
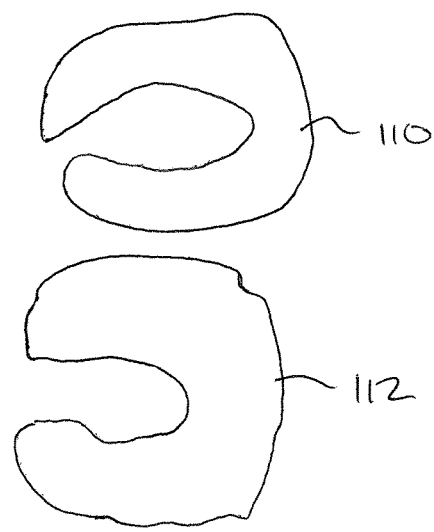
FIG. 21 illustrates an orbital septum membrane and a muscle member which are representative of an orbital septum and a muscle respectively for incorporation into the model of FIG. 35.

An orbital septum membrane 110 and a muscle member 112 are each separately moulded of silicone material as shown in FIG. 21. Each of these components is generally C-shaped about a central opening for alignment with the corresponding eyelid opening in the mold assembly described above. Opposing side portions 114 of the orbital septum at opposing ends of the C-shape thereof are positioned so that the inner edges thereof are adhered to and received beneath the outer perimeter portions of the two side portions of the tarsal plate member respectively. The muscle member 112 is subsequently laid over top of the forward edges of the conjunctiva sheet 102 which have been folded over the inner edges of the tarsal plate member. The muscle member similarly includes two opposing side portions 116 spaced apart at diametrically opposing locations relative to the eyelid opening therebetween in which each of the side portions of the muscle member overlays a forward portion of a respective one of the side portions of the tarsal plate member respectively. Suitable adhesive, for example uncured silicone which is permitted to cure, can be used to ensure a tightly adherent connection between the conjunctiva sheet and the tarsal plate member while providing a loosely adherent bond between the muscle member and the underlying structures.

A faceplate 118 formed of resilient silicone representative of skin is again provided similar to the faceplate 58 of the previous embodiments. The faceplate 18 further defines the eyelid opening between an upper eyelid portion and a lower eyelid portion which are laid over and bonded to respective ones of the two side portions of the muscle member at the forward edges of the conjunctiva sheet 102 respectively.

Figure 36:
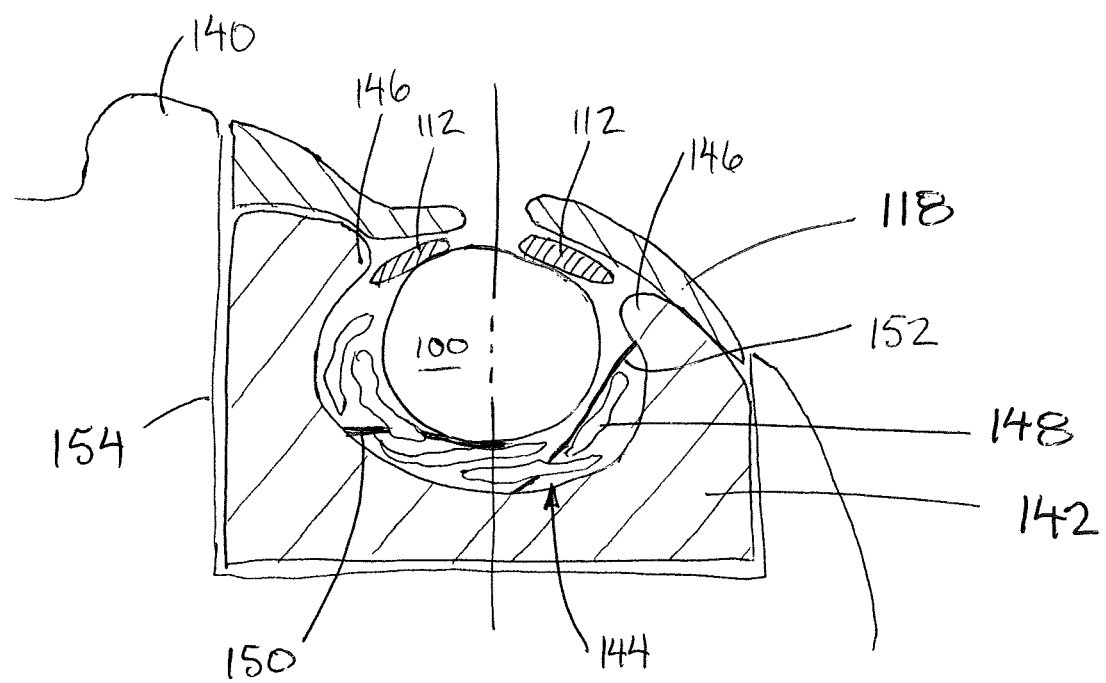
FIG. 36 is complete model assembly including an outer frame representative of a human head, a base frame representative of an orbital bone structure received in the outer frame, an eyelid structure model assembly overlaid on the base frame, and optionally the eye model assembly according to FIG. 33 received within the base frame.

The eyelid structure described above can be incorporated into the model assembly of FIG. 34, or optionally may be incorporated into a more complex outer frame 140 according to the model assembly of FIG. 36.

In the model assembly according to FIG. 36, a base frame 142 is provided of rigid material which includes a central socket 144 formed therein so as to have perimeter walls surrounding a recessed cavity which is open at the top side through an exterior opening defined by an annular rim portion 146 of the central socket formed in the base frame. The central socket is shaped to be representative of an orbital cavity for receiving an ocular globe therein similar to the central body 100 or the surgical body 20 described above.

Figure 27:
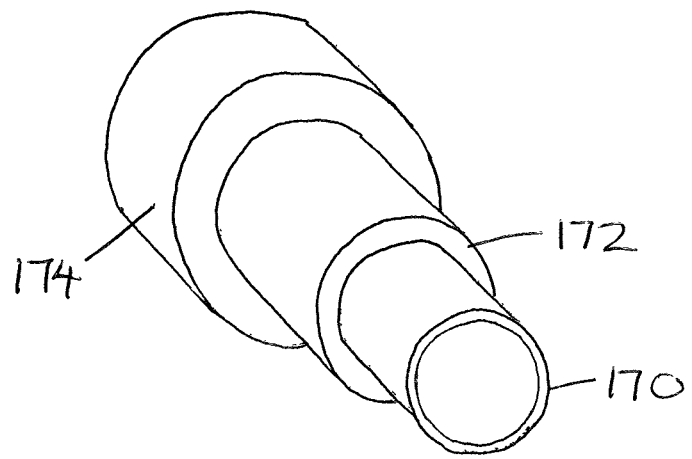
FIG. 27 is a schematic representation of a vascular structure which is modelled according to some embodiments of the invention.

As in previous embodiments, the central body is generally spherical in shape about a central axis spanning between a rear side and a front side of the central body. In addition to receiving the central body therein, the central socket 144 also includes a plurality of resilient strands 148 formed of silicone material which are intended to be representative of orbital fat. In addition, an elongate nerve strand 150 formed of moulded synthetic material and an elongate multilayer strand 152 moulded of synthetic material to be representative of a vascular structure according to FIG. 27 are also placed within the central socket so as to be representative of nerves and vascular structures within the anatomical model. The orbital fat is typically coated with a lubricant material to allow free movement of the resilient strands 148 relative to one another to optimally simulate human orbital fat. Once the above structures are placed into the central socket together with the central body, some or all of the components of the eyelid model assembly described above can be further positioned within the central socket followed by placement of the faceplate 118 covering over the exterior opening of the central socket with the exception of the eyelid opening in the faceplate through which the central body representing the ocular globe is visible. The outer frame 140 in this instance is representative of a human head and is typically formed of rigid material, for example a 3-D printed plastic. A pocket 154 is formed in the outer frame 140 at the location of one of the eyes to receive the base frame 142 therein such that the outer simulated skin surface of the faceplate 118 is substantially flush and aligned with the corresponding outer surface of the outer frame 140.

Formation of a multilayer strand 152 according to FIG. 27 can be initiated by providing an elongate pipe which is dipped into a dense silicone to create a core layer 170 representative of an intima. A variable adherence is created by allowing partial curing of the core layer 170 by application of an additional layer 172 of silicone about the full circumference and along the full length of the core layer which forms the tunica media. A softer silicone or silicone foam can then be applied about the full circumference and along the full length of the additional layer 172 to form an outermost layer 174 to be representative of the loose tunica external. The various techniques described herein to create different densities among the different layers or to provide different degrees of adherence between the different layers can be used, particularly when the multi-layer strand 152 is created to be representative of a vascular structure.

Figure 37:
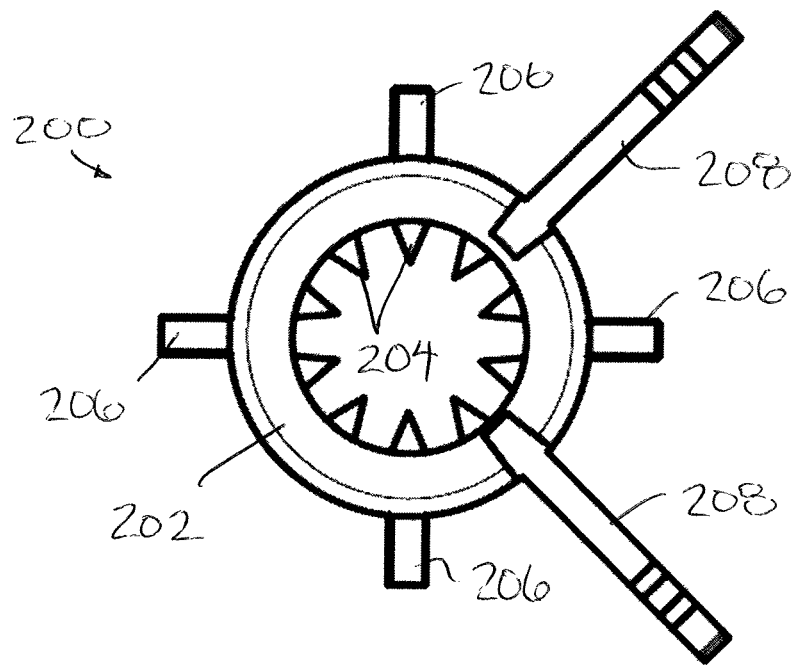
FIG. 37 is a top plan view of a rigid base element that can be attached at the rear of the surgical body according to an alternative embodiment of the present invention.
Figure 38:
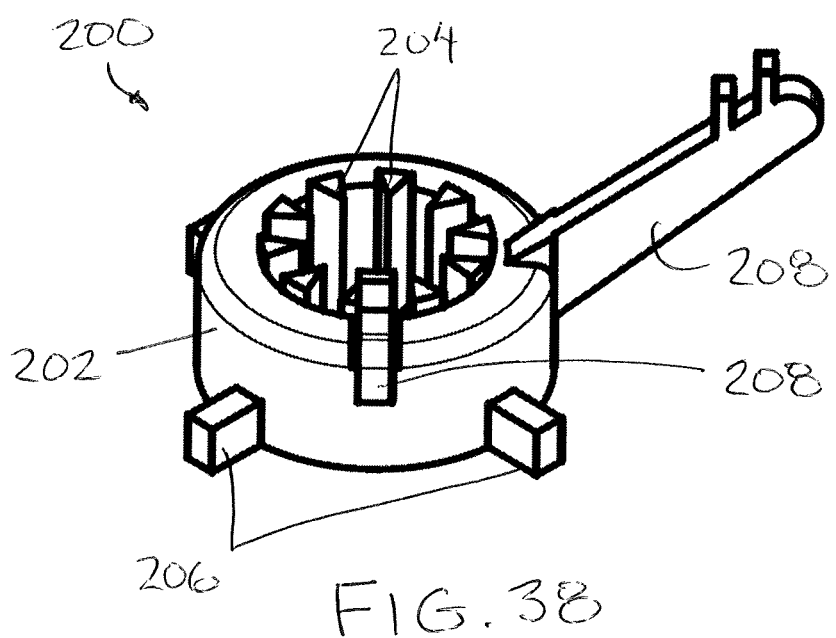
FIG. 38 is a perspective view of the rigid base element according to FIG. 37.

Turning now to FIGS. 37 through 40, the surgical body 20 according to the first embodiment of FIG. 33 may be modified to include a rigid base element 200 in place of the band 32 which secures the rectus muscles 30 at the rear end of the body 20. As best shown in FIGS. 37 and 38, the rigid base element comprises a rigid collar 202 including a central opening therein which receives the stem protruding from the rear of the core body therethrough in the mounted position. A plurality of teeth 204 are provided at the inner surface of the collar to protrude radially inwardly while being elongate in the axial direction. The teeth 204 serve to grip the stem protruding from the rear of the core body 20 which is received through the collar. The collar 202 also includes a set of four lugs 206 which protrude radially outwardly from the outer surface of the collar at evenly spaced positions about the circumference thereof. A pair of rigid support arms 208 also extended generally radially outwardly from the collar such that the pair of arms 208 are angularly offset from one another by approximately 90° with each arm being centered in the circumferential direction relative to a corresponding pair of the lugs 206. Each arm is thus angularly offset by approximately 45° relative to the lugs of the corresponding pair. Each of the arms 208 also extends radially outward at a slope offset in a common axial direction which is forwardly towards the front end of the core body received within the rigid base element 200. A suitable retention slot is formed at the free end of each of the support arms 208. When the core body is mounted onto the rigid base element 200, the free ends of the support arms 208 lie in a common horizontal plane extending through the center of the core body perpendicularly to the central axis thereof and perpendicularly to the stem.

The rigid base element receives the core body 12 mounted thereon subsequent to the sclera 24 being formed onto the core body and subsequent to the front ends of the rectus muscles 30 being attached at the forward end of the core body. The rectus muscles 30 are each aligned with a corresponding one of the lugs and are stretched under tension to span from respective forward ends integrally molded at the front-end of the core body to respective rear ends which are fixed onto respective ones of the lugs 206, for example by forming an aperture in the strand into which a corresponding lug 206 is hooked or received. Each rectus muscle 30 thus includes an intermediate portion which extends partway about the circumference of the core body in an uncoupled and floating relationship relative to the core body. Attaching the rear ends of the strands 32 to the respective lugs 206 allows the tension in the strands to be individually controlled.

In this embodiment, a pair of oblique muscle strands 31 are also provided in which the oblique muscle strands 31 are each fixed to the core body by integrally molding the first ends of the strands at a common lateral side of the core body approximately within a common plane as the free ends of the two support arms 208. The oblique muscle strands 31 comprise elongate resilient silicone members similarly to the rectus muscle strands 30. Each of the oblique muscle strands can then be stretched about a respective portion of the circumference of the core body so that the opposing second ends of the strands 31 can be adjustably secured within the respective retention slots at the free ends of the two arms 208 respectively. The configuration of the rigid base element allows each of the rectus muscles 30 and the oblique muscle strands 31 to be individually tensioned to extend partway about the circumference of the core body 20 while remaining in an uncoupled and floating relationship relative to the core body at an intermediate portion between opposing first and second ends which are fixed in relation to the core body.

Use of a lubricant material can surround the intermediate portions of the muscles so as to be located in a layer between the muscles and the core body as well as being located in a layer between the muscles and any additional layers overlapping the muscles. Subsequent to mounting of the muscle strands under tension, the core body in this instance is again enveloped by a conjunctiva sheet 42 which is fixed at the forward end of the core body as described above with regard to the first embodiment of FIG. 33. The conjunctiva sheet fully surrounds and envelops all of the rectus muscles 30, the oblique muscle strands 31, and the rigid base element 200 upon which they are tensioned. An additional clamping band 44 can then be secured directly below the rigid base element 200 to fix the conjunctiva sheet 42 at the rear of the core body similarly to the first embodiment according to FIG. 33. The core body in this instance is again joined to a plurality of suspension arms 46 which support the core body on a base frame in a similar manner to the previous embodiment.

Various particulars with regard to the method of construction of the above noted model assemblies will now be described in the following.

Strabismus Model

This model, shown in FIGS. 33 and 34, is designed for practicing strabismus surgery. In this surgery eye muscles are recessed or resected (moved forward or back) on the globe when someone has misaligned eyes (esotropia, exotropia).

Below is outlined the process for creating a multilaminar eye model for use in strabismus and other ophthalmic surgeries.

The model has many features that are unique and/or beneficial for practicing strabismus and other surgeries. These include:

A) a soft interior which simulates the vitreous cavity with its compressibility;

B) a rigid sclera which is can hold a suture;

C) extra-ocular muscles which are adhered to the sclera, under tension, and can be cut and re-sutured to the globe as in strabismus surgery;

D) a conjunctiva which overlays the muscles and globe which must be dissected through during ophthalmic surgery;

E) a base holder which allows for globe movement and rotation during simulated surgery;

F) a silicone face which enables proper hand positioning during surgery;

1 Creation of Vitreous/Globe

Figure 1:
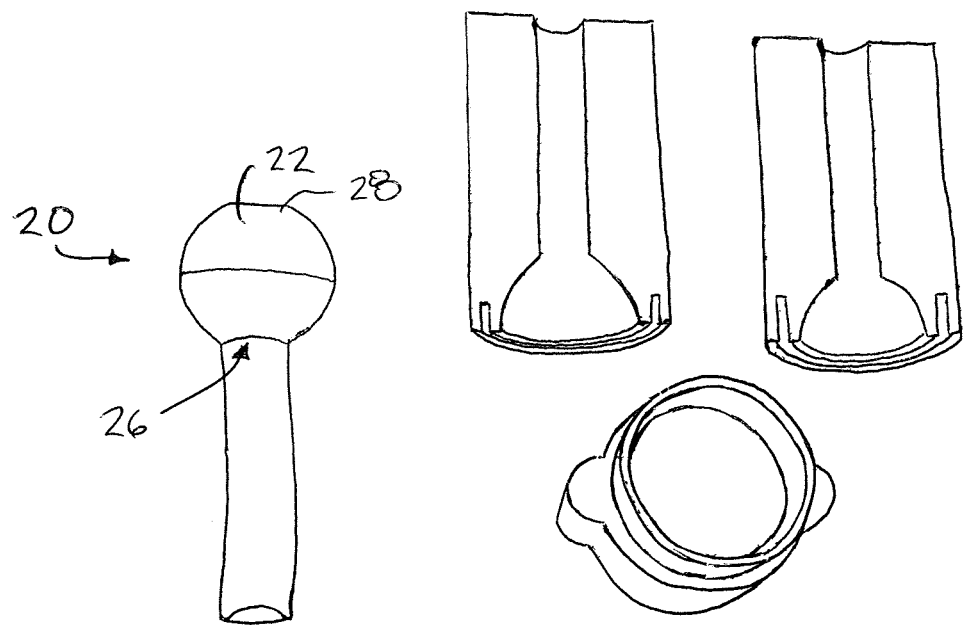
FIG. 1 illustrates a mold for forming the core material of a surgical body representative of an ocular globe.

Ecoflex Gel Silicone (Shore hardness 000-35) is poured in to a 3 part mould. as shown in FIG. 1.

2 Creation of Sclera

Figure 2:
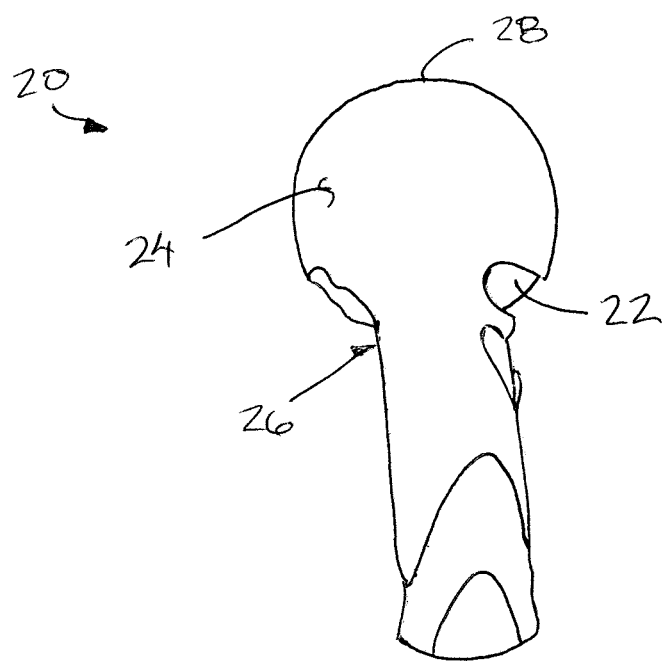
FIG. 2 illustrates application of an outer shell to the surgical body of FIG. 1 to be representative of a sclera.
Figure 3:
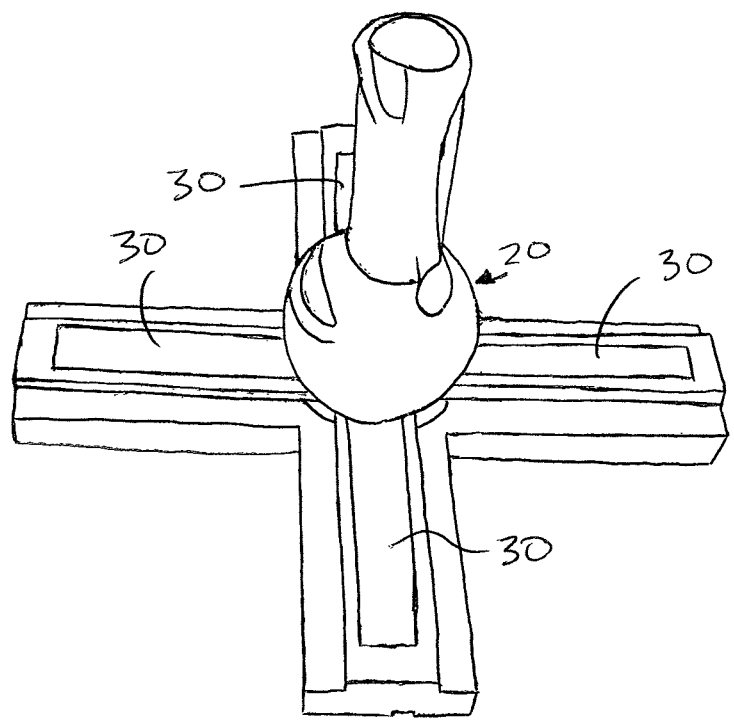
FIG. 3 illustrates a mold for molding muscles strands representative of muscles which are attached to the surgical body of FIG. 1.
Figure 4:
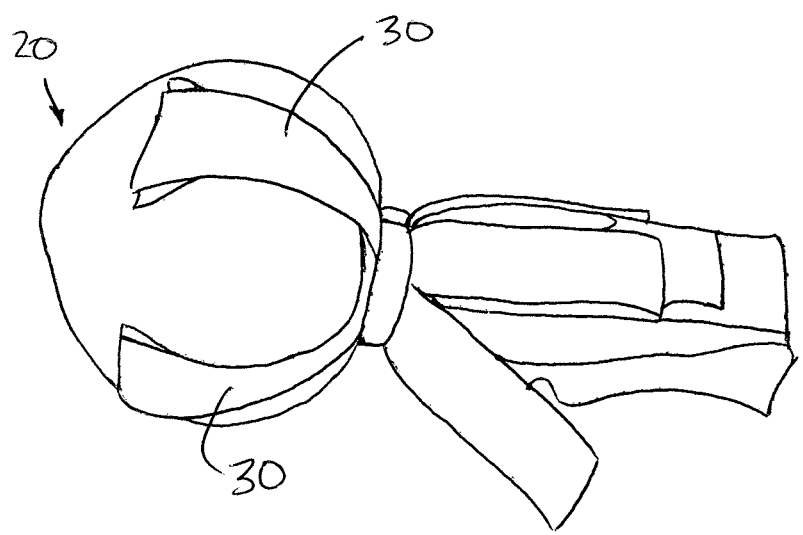
FIG. 4 illustrates the molded muscles strands secured under tension about the surgical body of FIG. 1.

Globes are dipped in Dragon Skin 10A silicone (Shore hardness 10A) and allowed to cure on a rack 2-3 times. This creates a soft to hard interface to mimic globe compressibility as shown in FIG. 2.

3 Creation of Muscles

The globe is placed upright in the mould. The muscles are poured and it makes contact with the globe at the proximal end (Dragon Skin). After curing the muscles are pulled back and secured with a plastic ring. The muscles are now under tension. They will now 'retract' back when cut just as they do in strabismus surgery. A light layer of silicone oil is applied under the muscles so that a more realistic tissue plane is created when 'hooking' the muscle. Silicone oil can also be added to the sclera before dipping to create thinner weaker tissue to make suture placement more difficult. An additive of micro-fibres can also be mixed with the silicone to change the tissue property/feel of the sclera.

Figure 39:
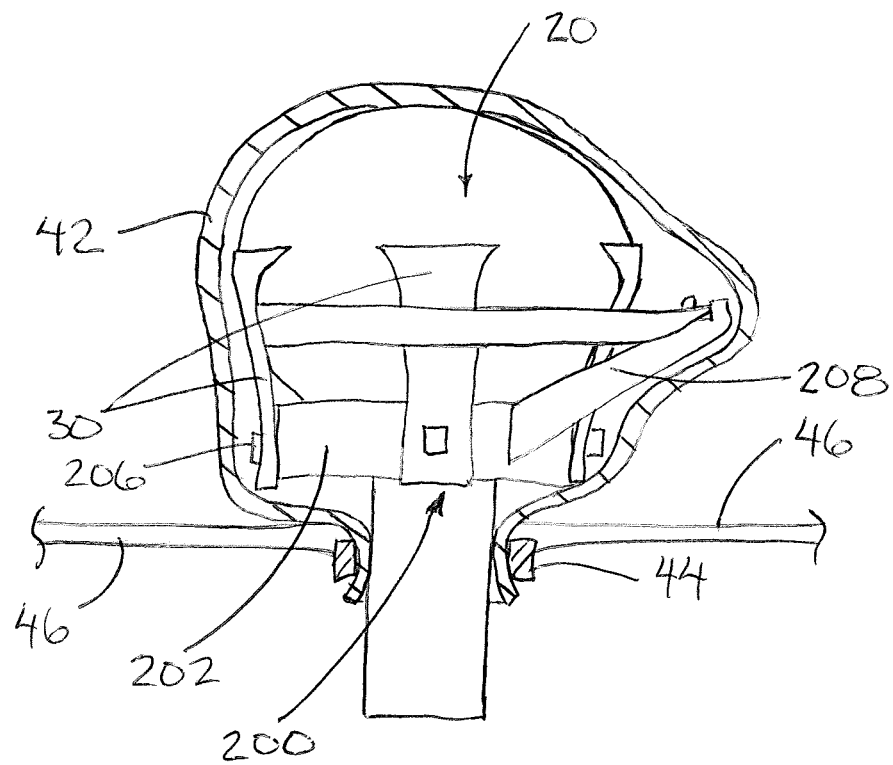
FIG. 39 is a partly sectional side view of the model when using the rigid base element according to the embodiment of FIG. 37 in which the conjunctiva sheet is shown in cross section for illustrative purposes.
Figure 40:
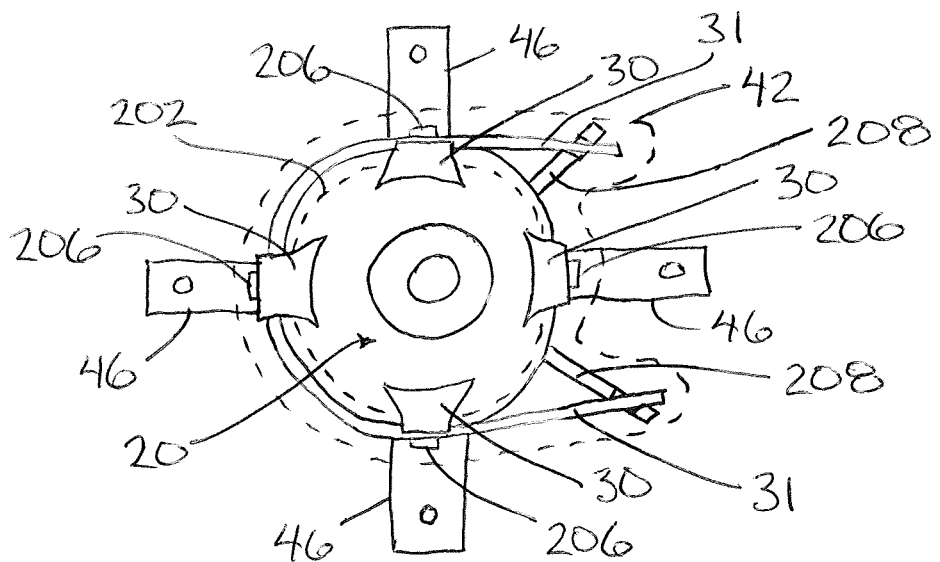
FIG. 40 is a top plan view of the model when using the rigid base element according to the embodiment of FIG. 37 in which an outline of the conjunctiva sheet is shown in broken line for illustrative purposes.

In an additional actualization of the model the superior oblique and inferior oblique muscles are also attached to the model as shown in FIGS. 39 and 40.

4 Creation of Cornea, Iris and Pupil

The cornea, iris and pupil are all poured separately (Dragon Skin) as shown in FIG. 5. An alternate method is to laser print an iris coloured sheet and adhere it with the silicone corneal cap.

5 Creation of Conjunctiva

The cornea, iris and pupil are all assembled in the bottom of the conjunctiva mould shown in FIG. 6. Then Dragon skin is poured in to the mould, and the 'plunger' part of the mould is used to compress the silicone and form a curved shape and allowed to cure.

An alternate method is to dip the tip of the conjunctiva mould pictured in FIG. 6 and simply set it upright.

6 Attaching the Cornea-Iris-Conjunctiva to the Globe

The cured cornea-iris-conjunctiva mould is then attached to the globe with a small amount of silicone (dragon skin) and allowed to cure. Once this is done Silicone thinner is used to lubricate under the muscles and conjunctiva to allow for realistic movement of the muscle hook later during simulated surgery. Next the conjunctiva is folded back and secured with a plastic ring. This effect creates a realistic tissue plane between the conjunctiva, muscles and sclera.

7 Creation of Four Arm Holders

The assembled globe is then placed in a final holder and silicone is poured which adheres to the conjunctiva. These four limbs will be attached to the base plate according to FIG. 7.

8 Creation of Base and Face Plate and Mounting of Globe

The base is created from a single one piece mould which is poured using urethane based plastic.

Figure 8:
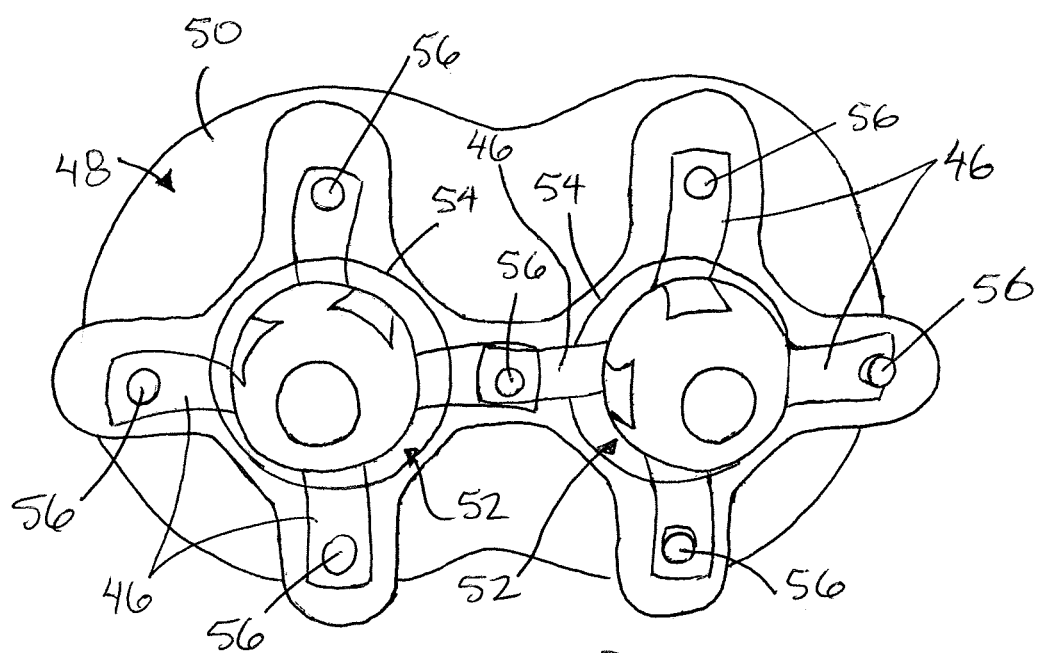
FIG. 8 shows the suspension arms supporting the surgical body of FIG. 1 on a base frame.

The globe is then mounted on to four pegs on the base plate as shown in FIG. 8. This allows the globe to rotate as it does in the human during surgery. Although used here for strabismus surgery, this could allow rotation of the globe during any ophthalmic surgery. The silicone arms also allow for movement of the eye when pushed on as it acts as an elastic sling for the model eye.

9 Face Plate Attachment

The face plate is dragon skin silicone which is then made from a two piece mould. Then the face mould is place over top and fits snugly on to the base as shown in FIGS. 9 and 10. The face plate provides counter traction and anatomic fidelity in placing your hands during surgery.

Cataract Model

A variation of the strabismus model used for cataract and other anterior segment surgeries. In addition to the features listed in the strabismus model, the following additional features are provided.

1 Creation of Lens

A multilaminated lens according to FIG. 11 is created which acts in a manner similar to the human lens. The human lens has multiple layers of nucleus and cortex which are removed as pieces during modern cataract surgery.

To create the lens a central nucleus of silicone is poured. It is allowed to partially set and then is dipped again and allowed in silicone. This process is repeated until the lens is the approximate thickness of the human lens. This process creates variable adhesion between the layers which mimics the human eye.

One variation of this process is to spray a silicone lubricant between the layers. This also varies the adhesion.

Another variation adds micro-fibres to the lens to create different densities of lens.

Another variation adds silicone oil to make ultrathin layers.

2 Creation of Capsule

The human lens sits within a capsular bag complex. After the lens is created a silicone non-adhesive is sprayed over it. Then the lens is placed in a mould and a thin layer of silicone is created by pouring it over the mould and allowed to drip and an inclination of 45 degrees. This creates an ultrathin layer with a tissue plane between the lens and capsule.

In another variation a silicone thinner is added to the mix before pouring on to the lens to make the capsule ultrathin.

3 Adhering Capsular Complex to Front of Sclera

The capsular complex with lens is then adhered to the front of the sclera (described previously in strabismus model steps 1 and 2) with silicone glue.

4 Creation of Anterior Segment

The iris and cornea are then created and adhered over to of the lens complex. The major difference to the strabismus model is that there is a space left between the iris and cornea centrally known as the 'anterior chamber', analagous to that of the human eye.

5 Addition of Muscles, Conjunctiva and Mounting in the Face Plate

The remainder of the processing of the eyes is the same as that in steps 5-9 described in strabismus surgery.

Cadaveric Model

An additional base plate is created similar to the one featured in the strabimsus model of FIG. 33. It includes a cut side that surgical tubing can be connected to a syringe. A flat plate embedded in step #7 of the strabismus arm holders allows a cadaveric eye to be mounted in the base and utilized to practice ophthalmic surgery.

Anatomic Model of Orbital Bone, and Eyelid Structures

Figure 12:
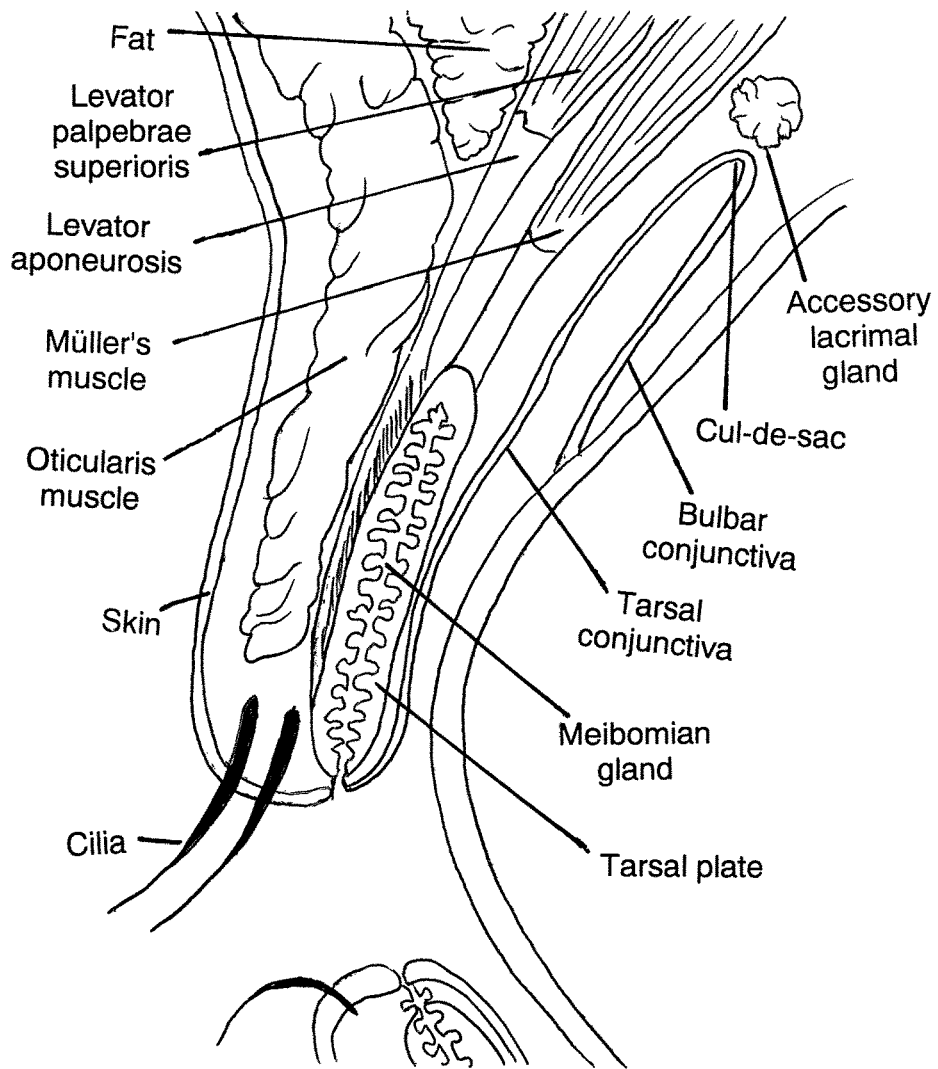
FIG. 12 schematically represents a human eyelid structure to be represented by some embodiments of the model assemblies described herein.

Described in the following is the process for constructing the multi laminated eyelid structure accordingly to FIG. 35. The difficulty with creating structures like the eye lid or the lip is that they have several densely packed layers as shown in FIG. 12, each with a complex folded 3D shape, and the level of adherence between the layers is variable, from strong adherence to no adherence. Challenges in the manufacturing process are defined below and followed by a pictorial demonstration of the process.

The first major problem is creating the inner layer of the multilayered structure. The inner layer is a complex 3D structure and the material, usually silicone rubber, cannot be cast directly into this shape. The liquid will simply not stay in position during the curing process. Second this inner layer will always be adjacent to another silicone layer, and curing silicone will always fuse to another adjacent silicone layer. So lets use our eyelid structure as an example. The inner layer, the tarsal conjunctiva, is directly opposite the globe (eyeball) and the bulbar conjunctiva. They are essentially continuous with a potential space in between, meaning they will always be in contact unless you pull on the eyelid and the space opens up between them. There can be no adherence between the tarsal conjunctiva (the inner layer of the eyelid) and the eyeball (the adjacent layer) yet they need to be form fitting to the point without any gaps.

The second challenge is that some of the layers are tightly adherent, such as the conjunctiva to the tarsal plate, and some layers are loosely adherent such as the muscles and underlying fat. These loosely adherent layers are key surgical landmarks and allow for the operation to be performed and so have to be accurately replicated. As previously discussed curing silicone layers on top of each other will cause fusion and create an inseparable bond. You would think that the answer would be to form the layers separately and then use a loose adhesive to laminate them, however there is no such commercially available adhesive. So in conventional silicone modelling your layers would be either fused completely or not fused at all.

To create the loose adherence required the layers are formed separately using a very fast cure silicone and then laminated at the critical time just before they are fully cured. When laminated at this time the layers will form a loose adherence, allowing for surgical separation without destruction of either layer.

This method is not always available because it is time sensitive and accordingly a novel silicone adhesive is also being developed as well to form loose adherence between cured silicone layers.

Here is the process step by step with images

Figure 13:
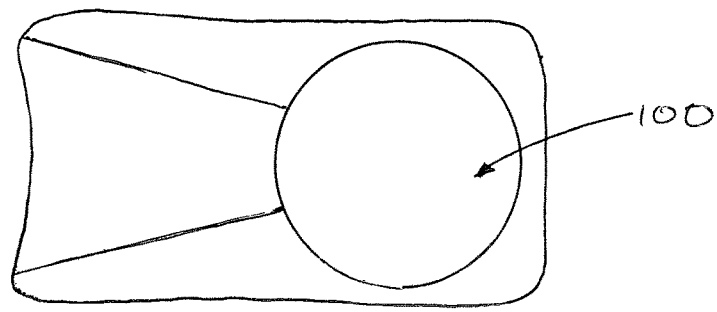
FIG. 13 illustrates a mold for forming the central body in the model assembly of FIG. 35.

1 Creation of the globe (eyeball). Poured silicone into a standard two-part mould as shown in FIG. 13.

Figure 15:
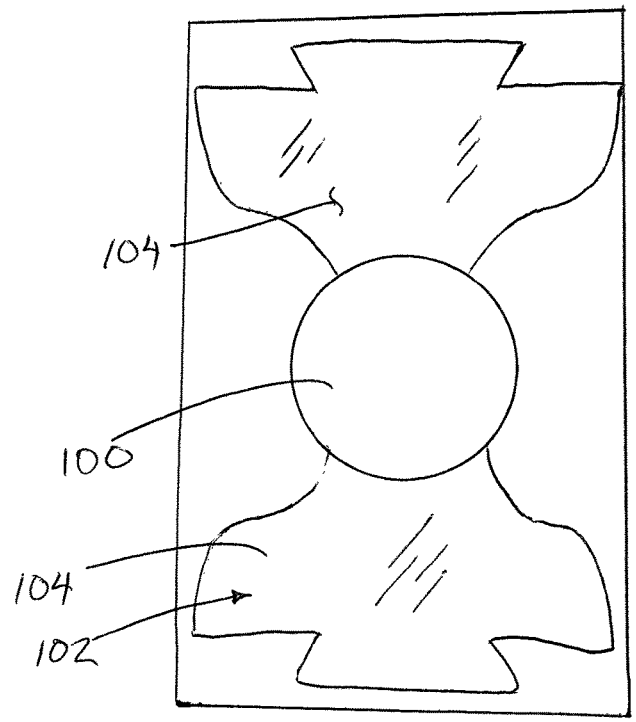
FIG. 15 illustrates the mould of FIG. 14 with the conjunctiva sheet partially formed therein.
Figure 16:
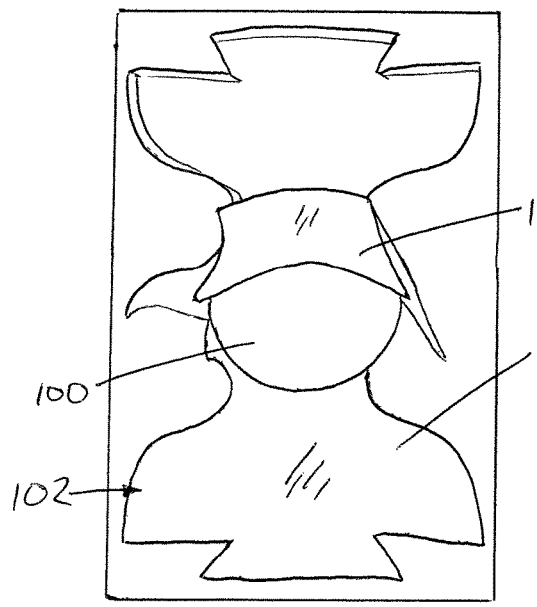
FIG. 16 and FIG. 17 illustrate sequential folding of the two opposing side portions of the conjunctiva sheet about the central body.
Figure 17:
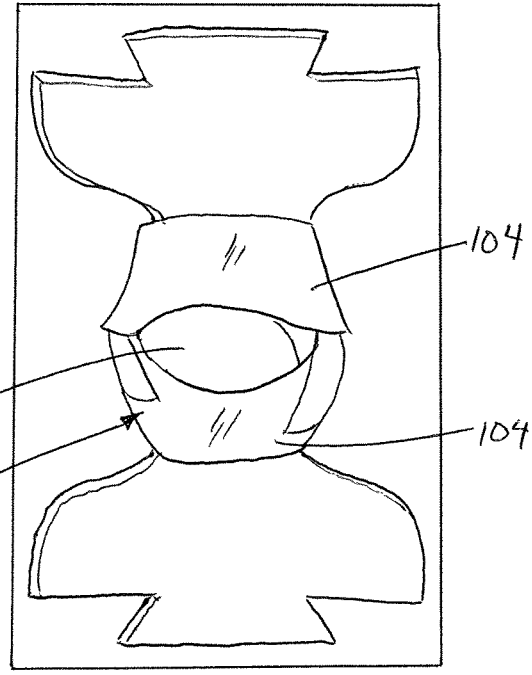

2 Creation of the conjunctive (inner layer of the eyelid). The previously created globe is inserted into the conjunctival mould shown in FIG. 14. Silicone is then poured and fully cured as shown in FIG. 15. This creates two flat sheets of conjunctiva which are attached to the globe. The shape of these flat sheets is critical, is they must fold into a complex 3D shape.

3 Folding of the conjunctiva to create the potential space between the conjunctiva (inner eyelid layer) and the globe (eyeball). The flat sheets of conjunctiva are folded onto the globe and adhesive is used only at the bottom edge to seal the apex of the potential space according to FIGS. 16 and 17. In the above eyelid cross section image this area of adherence is labeled "cul-de-sac".

Figure 19:
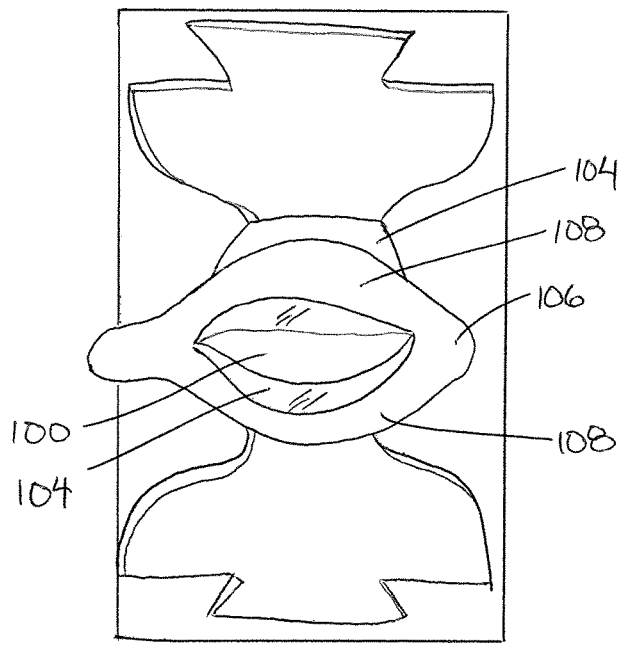
FIG. 19 and FIG. 20 illustrates the placement of the tarsal plate member onto the conjunctiva sheet of FIG. 17 before and after folding of the edges of the conjunctiva sheet over two opposing side portions of the tarsal plate member respectively.
Figure 20:
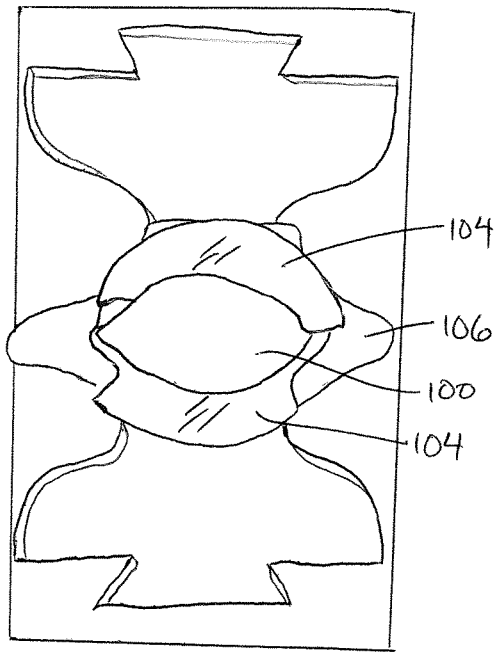

4 Lamination of the tarsal plate to the conjunctiva. A separately moulded tarsal plate as shown in FIG. 18 is laminated to the conjunctiva. Note the conjunctiva must wrap under the tarsal plate and then tightly wrap the edge of the tarsal plate onto the anterior surface as shown in FIGS. 19 and 20.

Figures 22, 23:
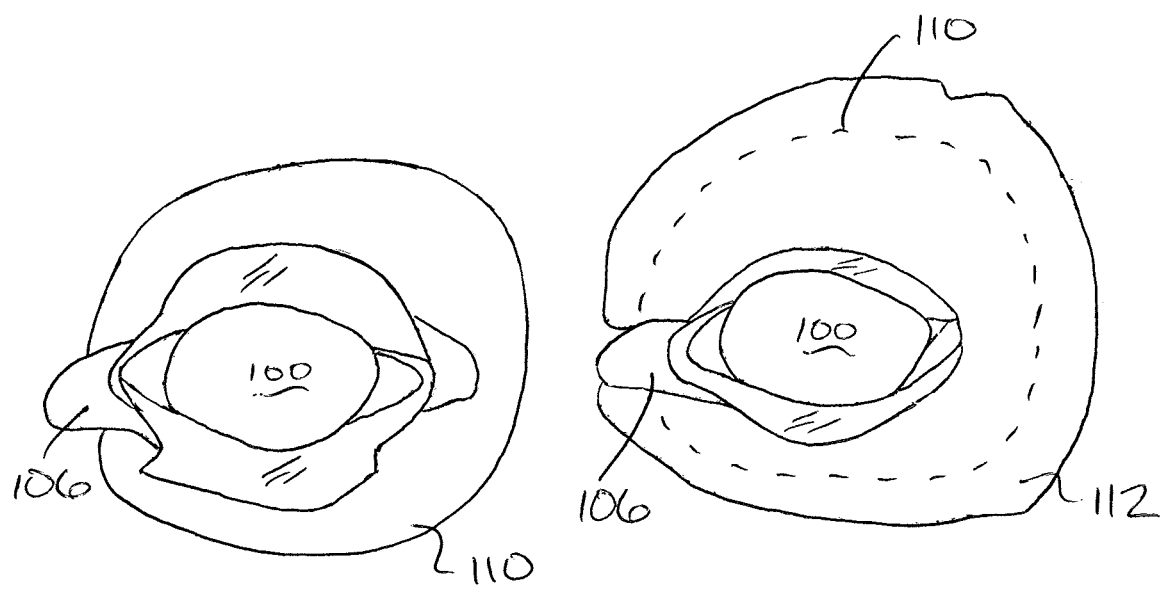
FIG. 22 illustrates placement of the orbital septum member of FIG. 21 beneath opposing side portions of the tarsal plate member.
FIG. 23 illustrates placement of the muscle member of FIG. 21 to lay over top of various underlying structures in the model of the FIG. 35.

5 Lamination of the orbital septum and orbicularis muscle. The orbicularis muscle and orbital septum are formed separately as shown in FIG. 21 and allowed to cure to the critical point right before full cure, then the septum is quickly glued to the undersurface of the tarsal plate as shown in FIG. 22 and the muscle is laminated on top of this as shown in FIG. 23. This creates the loose adherence between the muscle and the septum. The muscle is glued to the edge of the reflected conjunctiva.

Figure 24:
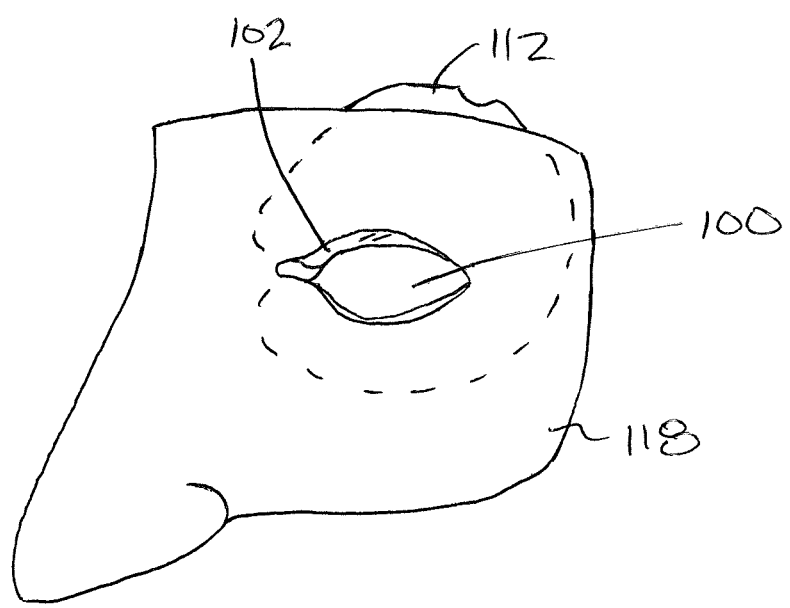
FIG. 24 illustrates placement of an outer skin layer to form the outermost layer in the model of FIG. 35.

6 Lamination of the skin to the eyelid margin and the muscle. The final step is to glue the outer skin layer to the underlying muscle and eyelid margin as shown in FIG. 24.

Fracture Model Modification

The eyelid structure can be over-layed upon a model skull/orbit to simulate orbital fracture repairs according to the model of FIG. 36.

Figure 25:
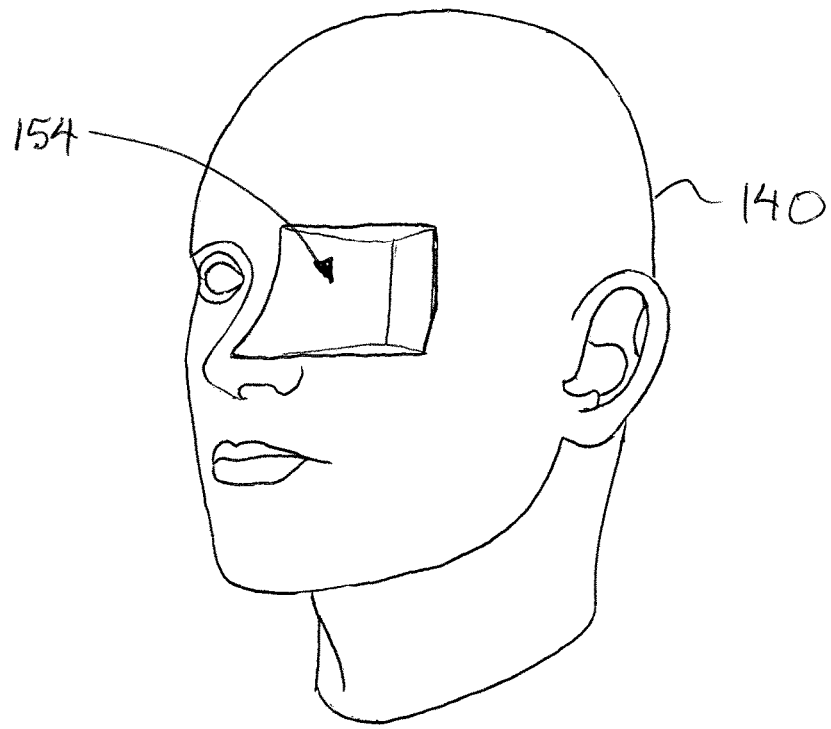
FIG. 25 illustrates an outer frame which is representative of a human head according to the model of FIG. 36 for receiving the model assembly of FIG. 35 therein.

1 Model head. A model head is printed in plastic or PLA as shown in FIG. 25.

Figure 26:
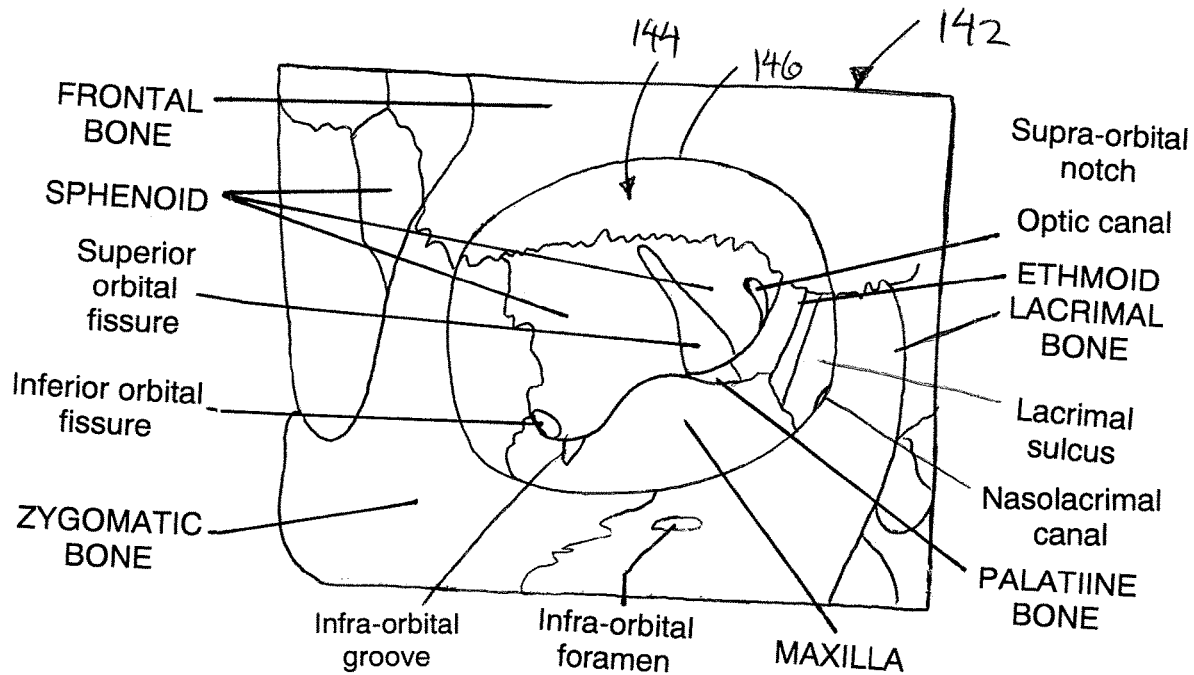
FIG. 26 is a schematic representation of the bone structure of an orbital socket which is represented by the base frame in the model assembly of FIG. 36.

2 Bone Orbit. The orbital walls which consist of bone are printed in PLA with the fractures present according to FIG. 26.

3 Neurovascular structures. Arteries, veins and nerves are molded. In the simplest iteration a small pipe of variable diameter is dipped in silicone and allowed to cure. More complex arteries can be created by an alternate method. The intima is first created by dipping the pipe in to dense silicone. A variable adherence is created by allowing partial curing of the intima and then applying an additional layer to form the tunica media. Lastly a softer silicone or silicone foam can be applied external to this to form the loose tunica external according to FIG. 27. A silicone thinner can be added to form different thicknesses of silicone. Silicone non-adhesive can also be applied to create variable interfaces.

4 Orbital Fat. Orbital fat is made by pouring silicone in to a phalange like mould. The interdigitation of the mould allows the fat to move dynamically as it does in the human orbit. Addition of a silicone lubricant is applied and allows the orbital fat to move more freely.

Figure 28:
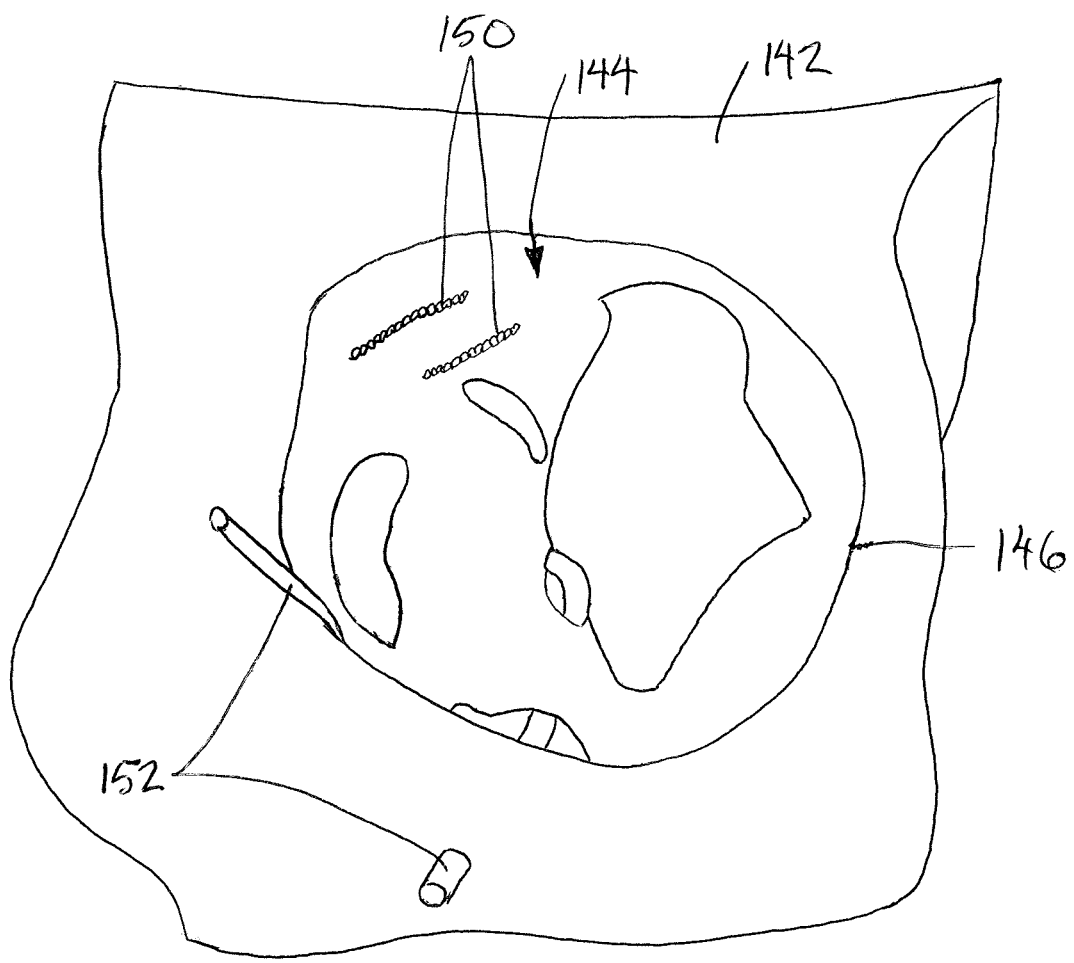
FIG. 28 illustrates a front view the base frame according to the model of FIG. 36 which is schematically represented in the FIG. 26.
Figure 29:
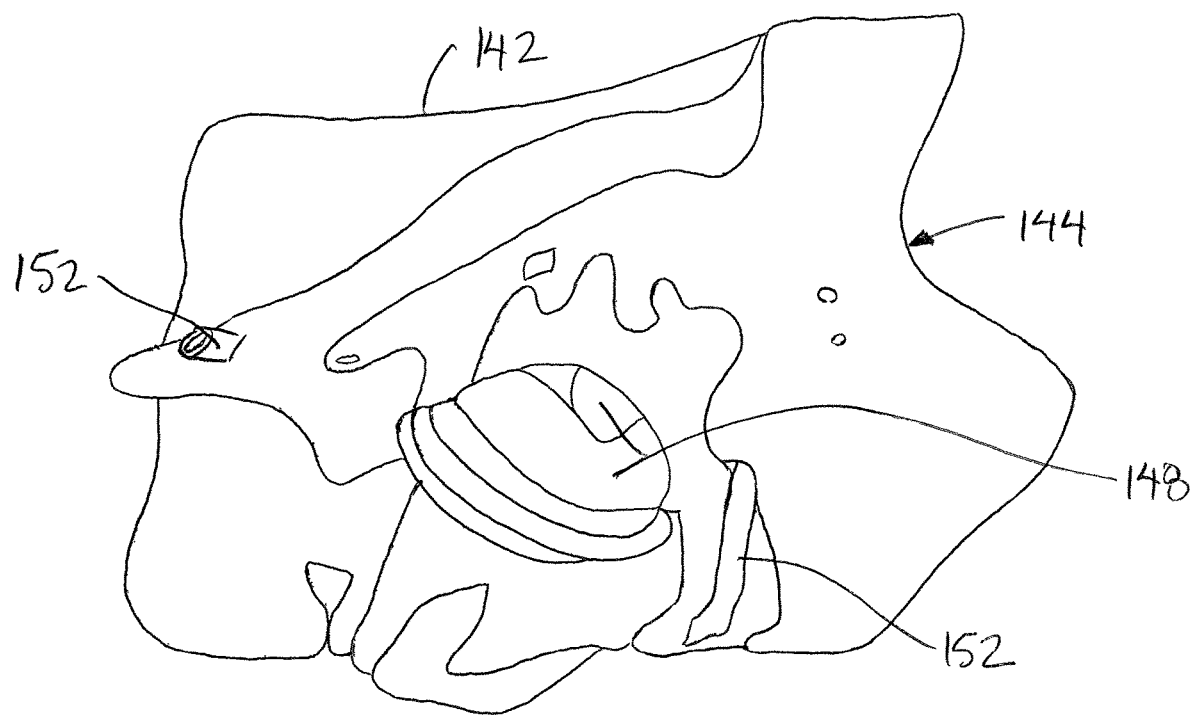
FIG. 29 illustrates a rear view of the base frame according to FIG. 28.

5 Placing neurovascular and orbital fat in orbit bone according to FIG. 28 and FIG. 29.

Figure 30:
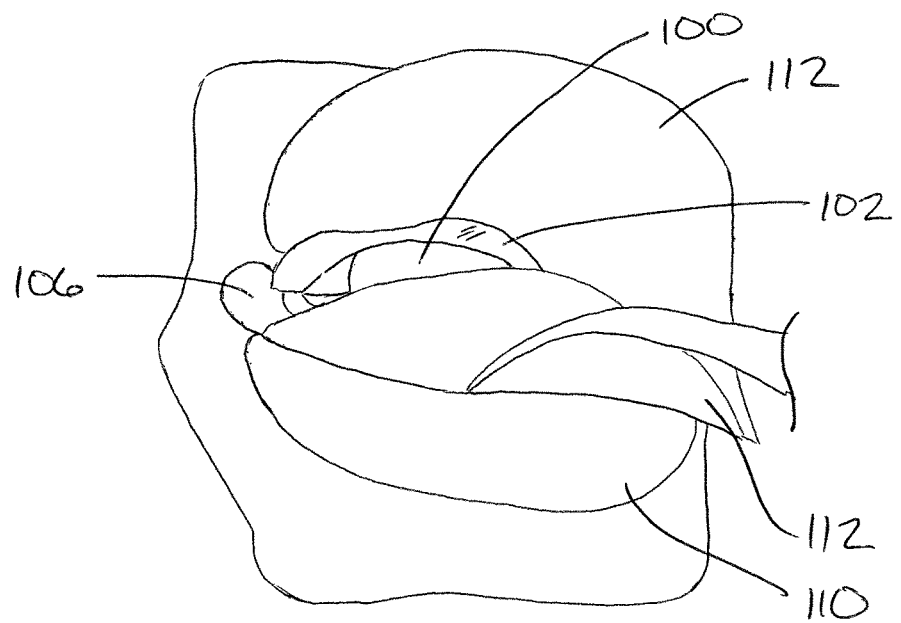
FIG. 30 illustrates the base frame according to the model of FIG. 36 with the central body, the tarsal plate member, the muscle member, and the outer skin layer according to the model of FIG. 35 received therein.
Figure 31:
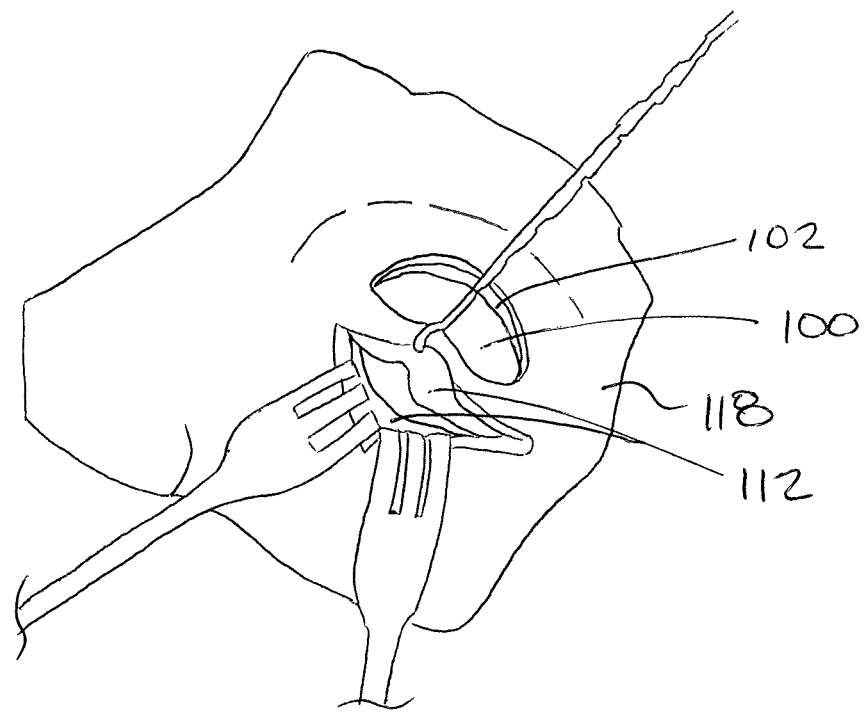
FIG. 31 illustrates the eyelid model assembly according to FIG. 35 received within a base frame according to FIG. 36 which is further received within the outer frame according to FIG. 25, shown in use during a simulated surgery.
Figure 32:
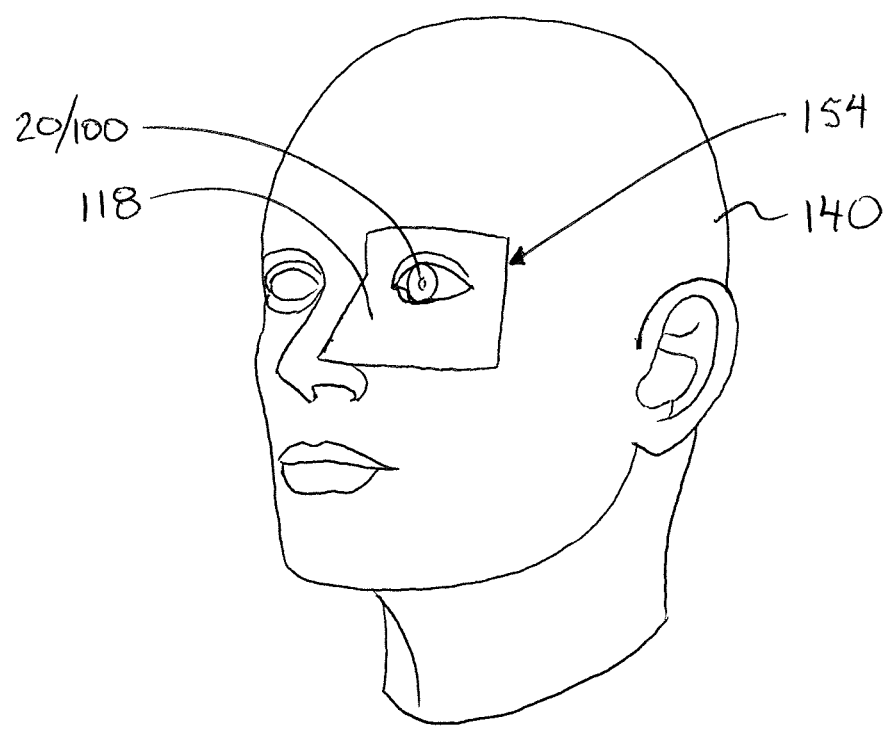
FIG. 32 illustrates a further view outer frame receiving the base frame and eyelid model assembly according to FIG. 35 therein, as well as incorporating the eye model assembly of FIG. 33 therein.

6 placement of orbit bone in face plate and overlaying of eyelids results in a structure according to FIG. 30. The bony orbit is placed in the face plate according to FIG. 31 and FIG. 32. The eyelids described previously are adhered to the faceplate.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A surgical eye model assembly for simulating eye surgery using surgical tools, the assembly comprising:

a surgical body formed of material which can be readily cut using the surgical tools, the surgical body defining a central axis extending from a rear mounting side to a front side which is generally semicircular about the central axis so as to be representative of an ocular globe;

a plurality of suspension arms extending radially outward from the surgical body in proximity to the rear side at circumferentially spaced apart locations about the central axis, each suspension arm comprising an elongate strip of resilient material;

a rigid base frame comprising a central recess and a plurality of mounting locations at circumferentially spaced apart locations about the central recess;

the suspension arms being coupled under tension to respective ones of the mounting locations on the rigid base frame such that the surgical body is resiliently suspended within the central recess in a normal position so as to allow for translating movement of the surgical body along the central axis relative to the base frame from the normal position and so as to allow for angular deflection of the central axis relative to the base frame from the normal position while biasing the surgical body to return to the normal position.

2. The assembly according to claim 1 wherein the surgical body is formed of a synthetic resilient material.

3. The assembly according to claim 1 further comprising a face plate adapted to be mounted on the base frame and defining an eye opening therein for alignment with the surgical body, the face plate further comprising two diametrically opposed eyelid portions for overlapping respective portions of the front side of the surgical body which frictionally engage the surgical body and which pre-tension the suspension arms.

4. The assembly according to claim 1 further comprising:

a face plate formed of resilient material releasably mounted onto the base frame, the face plate having an outer surface which is shaped to represent at least a cheekbone area, a nose, and a brow portion of a human face surrounding an eye opening in the face plate;

the eye opening of the faceplate being reduced in size relative to a circumference of the surgical body so as to define a lower eyelid portion and an upper eyelid portion which partially overlap diametrically opposing portions of the semicircular front side of the surgical body respectively.

5. The assembly according to claim 1 further comprising a rigid base element fixed to the surgical body at a rear of the surgical body, the suspension arms protruding radially from the surgical body at a location below the rigid base element.

6. The assembly according to claim 1 wherein the surgical body comprises:

a core member representative of a sclera; and a plurality of muscular strands formed of resilient material which are elongate between opposing first and second ends which are mounted in fixed relation to the core member such that an intermediate portion of each muscular strand is uncoupled relative to the core member and extends under tension partway about a circumference of the core member.

7. The assembly according to claim 1 wherein the surgical body comprises:

a core member representative of a sclera;

a plurality of muscular strands supported on the core member to extend partway about a circumference thereof; and a conjunctiva sheet spanning over the core member and the muscular strands between the front and rear sides of the body;

the conjunctiva sheet being fixedly coupled at a central location on the sheet to the core member at the front side of the body and being fixedly coupled in relation to the core member at the rear side of the body;

the conjunctiva sheet including an intermediate portion between the front and rear sides which spans over the muscular strands which is supported in floating relationship relative to the core member and the muscular strands.

8. The assembly according to claim 1 wherein the surgical body comprises:

a spherical outer shell representative of a sclera formed of a first resilient material having a wall thickness which is less than 10% of an outer diameter of the outer shell; and a core material filling the spherical outer shell, the core material comprising a second resilient material which is softer than the first resilient material forming the outer shell.

9. A surgical model assembly for use with a base frame in a surgical eye model for simulating eye surgery using surgical tools, the base frame defining an ocular cavity receiving the surgical model assembly therein such that the surgical model assembly is readily releasable from the base frame, the surgical model assembly comprising:

a surgical body comprising a core member representative of a sclera and formed of material which can be readily cut using the surgical tools, the surgical body defining a central axis extending from a rear mounting side to a front side which is generally semicircular about the central axis so as to be representative of an ocular globe;

the surgical body further comprising an iris member representative of an iris and a cornea member representative of a cornea which are supported at the front side of the core member by a conjunctiva sheet forming an envelope surrounding the surgical body.

10. A surgical model assembly for use with a base frame in a surgical eye model for simulating eye surgery using surgical tools, the base frame defining an ocular cavity receiving the surgical model assembly therein such that the surgical model assembly is readily releasable from the base frame, the surgical model assembly comprising:

a surgical body formed of material which can be readily cut using the surgical tools, the surgical body defining a central axis extending from a rear mounting side to a front side which is generally semicircular about the central axis so as to be representative of an ocular globe;

the surgical body comprising:

a core member representative of a sclera; and a lens member representative of an ocular lens which is supported on the core member at the front side of the body;

the lens member comprising:

a nucleus formed of silicone; and a plurality of cortex layers in sequential layers of silicone surrounding the nucleus, each cortex layer being applied when the previously applied layer has only partially cured such that the cortex layers are partially adhered to one another while remaining separable from one another using the surgical tools.

11. A surgical model assembly for use with a base frame in a surgical eye model for simulating eye surgery using surgical tools, the base frame defining an ocular cavity receiving the surgical model assembly therein such that the surgical model assembly is readily releasable from the base frame, the surgical model assembly comprising:

a surgical body formed of material which can be readily cut using the surgical tools, the surgical body defining a central axis extending from a rear mounting side to a front side which is generally semicircular about the central axis so as to be representative of an ocular globe;

the surgical body comprising:

a core member representative of a sclera;

a lens member representative an ocular lens; and a capsular envelope representative of a capsule receiving the lens member therein and supporting the lens member on the core member at the front side of the body;

the lens member comprising a plurality of layers of silicone material; and the capsular envelope comprising a layer of silicone material which is thinner than the layers of silicone material forming the lens member and which is loosely bonded to the lens member such that the capsular envelope is less resistant to shearing from the lens member than the layers of the lens member are from one another.

12. A surgical model assembly for use with a base frame in a surgical eye model for simulating eye surgery using surgical tools, the base frame defining an ocular cavity receiving the surgical model assembly therein such that the surgical model assembly is readily releasable from the base frame, the surgical model assembly comprising:

a surgical body defining a core member representative of a sclera and being formed of material which can be readily cut using the surgical tools, the surgical body defining a central axis extending from a rear mounting side to a front side which is generally semicircular about the central axis so as to be representative of an ocular globe;

the surgical body further comprising:

a rigid element mounted at the rear mounting side of the core member; and a plurality of muscular strands formed of resilient material which are elongate between (i) first ends mounted in fixed relation to the core member in proximity to the front side of the core member and (ii) opposing second ends secured on the rigid element at the rear mounting side of the core member such that an intermediate portion of each muscular strand is uncoupled relative to the core member and extends under tension partway about a circumference of the core member.

13. The assembly according to claim 12 wherein the first and second ends of the muscular strands comprise front and rear ends in which the front ends of the muscular strands are joined to the core member at the front side of the body at circumferentially spaced positions about the central axis and the rear ends of the muscular strands are coupled in fixed relation to the rigid element at the rear mounting side of the body so as to be individually tensioned about the core member between the front and rear ends whereby the muscular strands simulate rectus muscles.

14. The assembly according to claim 12, further comprising:

a pair of rigid support arms extending radially outward from the rigid element that is fixed to the surgical body at the rear mounting side of the surgical body to respective free ends of the rigid support arms; and a pair of oblique strands formed of resilient material which are elongate between (i) first ends mounted on the core member at one side of the surgical body opposite from the rigid support arms and (ii) second ends mounted on the free ends of the rigid support arms such that an intermediate portion of each oblique strand is uncoupled relative to the core member and extends under tension partway about the circumference of the core member, whereby the oblique strands simulate oblique muscles.

15. The assembly according to claim 12 wherein (i) the first ends of the muscular strands are fixed onto a common first side of core member, (ii) the intermediate portions extend circumferentially about diametrically opposing portions of the core member, and (iii) the second ends are mounted on rigid support elements protruding from a second side of the core member opposite the first side of the core member whereby the muscular strands simulate superior and inferior oblique muscles.

16. The assembly according to claim 12 further comprising a lubricant between the muscular strands and the core member.

17. The assembly according to claim 12 further comprising a conjunctiva sheet joined between the front and rear sides of the core member and a lubricant received between the conjunctiva sheet and the core member.

18. The assembly according to claim 12 further comprising:

a pair of rigid support arms extending radially outward from the rigid element that is fixed to the surgical body at the rear mounting side of the surgical body to respective free ends of the rigid support arms; and a pair of oblique strands formed of resilient material which are elongate between (i) first ends mounted on the core member at one side of the surgical body opposite from the rigid support arms and (ii) second ends mounted on the free ends of the rigid support arms such that an intermediate portion of each oblique strand is uncoupled relative to the core member and extends under tension partway about the circumference of the core member, whereby the oblique strands simulate oblique muscles.

19. A surgical model assembly for use with a base frame in a surgical eye model for simulating eye surgery using surgical tools, the base frame defining an ocular cavity receiving the surgical model assembly therein such that the surgical model assembly is readily releasable from the base frame, the surgical model assembly comprising:

a surgical body formed of material which can be readily cut using the surgical tools, the surgical body defining a central axis extending from a rear mounting side to a front side which is generally semicircular about the central axis so as to be representative of an ocular globe;

the surgical body comprising:

a core member representative of a sclera;

a plurality of muscular strands supported on the core member at circumferentially spaced apart positions about the central axis of the body; and a conjunctiva sheet spanning over the core member and the muscular strands between the front and rear sides of the body;

the conjunctiva sheet being fixedly coupled at a central location on the sheet to the core member at the front side of the body and being fixedly coupled in relation to the core member at the rear side of the body;

the conjunctiva sheet including an intermediate portion between the front and rear sides which spans over the muscular strands and which is supported in an uncoupled and floating relationship relative to the core member and the muscular strands.

20. The assembly according to claim 19 further comprising a lubricant received between the conjunctiva sheet and the core member.

* * * * *